(12) United States Patent
Hwang et al.

(10) Patent No.: US 10,691,132 B2
(45) Date of Patent: Jun. 23, 2020

(54) VEHICLE CONTROL DEVICE MOUNTED ON VEHICLE AND METHOD FOR CONTROLLING THE VEHICLE

(71) Applicant: LG Electronics Inc., Seoul (KR)

(72) Inventors: Inyoung Hwang, Seoul (KR); Sanga Kim, Seoul (KR); Kyoungha Lee, Seoul (KR); Taeyoung Jeon, Seoul (KR); Kangmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 158 days.

(21) Appl. No.: 15/873,610

(22) Filed: Jan. 17, 2018

(65) Prior Publication Data

US 2019/0072974 A1 Mar. 7, 2019

(30) Foreign Application Priority Data

Sep. 5, 2017 (KR) .......................... 10-2017-0113318

(51) Int. Cl.
*G05D 1/02* (2020.01)
*G05D 1/00* (2006.01)
(Continued)

(52) U.S. Cl.
CPC .......... *G05D 1/0221* (2013.01); *B60W 50/14* (2013.01); *G01C 21/3415* (2013.01); *G01C 21/3484* (2013.01); *G01C 21/3617* (2013.01); *G05D 1/0061* (2013.01); *G05D 1/0246* (2013.01); *G05D 1/0255* (2013.01); *G05D 1/0274* (2013.01); *G05D 1/0278* (2013.01); *G06K 9/00798* (2013.01); *G06K 9/00805* (2013.01); *G06K 9/00818* (2013.01); *B60K 2370/175* (2019.05); *B60W 2050/0089* (2013.01);
(Continued)

(58) Field of Classification Search
USPC .......................................................... 701/23
See application file for complete search history.

(56) References Cited

U.S. PATENT DOCUMENTS

2013/0231824 A1 9/2013 Wilson et al.
2014/0156182 A1* 6/2014 Nemec ..................... G08G 1/16
                                                                         701/430
(Continued)

FOREIGN PATENT DOCUMENTS

DE 102010023162 12/2011
DE 102013015348 4/2014
(Continued)

*Primary Examiner* — Lail A Kleinman
*Assistant Examiner* — Mahmoud M Kazimi
(74) *Attorney, Agent, or Firm* — Fish & Richardson P.C.

(57) ABSTRACT

The present invention relates to a vehicle control device provided in a vehicle and a method of controlling the vehicle. A vehicle control device according to one embodiment of the present invention includes a processor to autonomously run a vehicle using driving information that the vehicle has traveled in a manual driving mode, wherein the driving information includes a start place where the manual driving mode is started, an end place where the manual driving mode is ended, and a travel route from the start place to the end place, wherein the processor autonomously runs the vehicle along the travel route from the start place to the end place when the vehicle has moved up to the start place through manual driving.

18 Claims, 25 Drawing Sheets

(51) Int. Cl.
  *G01C 21/36* (2006.01)
  *B60W 50/14* (2020.01)
  *G01C 21/34* (2006.01)
  *G06K 9/00* (2006.01)
  *G01S 13/931* (2020.01)
  *B60W 50/00* (2006.01)

(52) U.S. Cl.
  CPC ... *B60W 2050/146* (2013.01); *B60W 2554/00* (2020.02); *B60W 2556/65* (2020.02); *G01S 2013/9318* (2020.01); *G01S 2013/9323* (2020.01); *G01S 2013/9324* (2020.01); *G05D 1/0088* (2013.01); *G05D 2201/0213* (2013.01)

(56) References Cited

U.S. PATENT DOCUMENTS

| | | | |
|---|---|---|---|
| 2017/0135621 A1* | 5/2017 | Lee | G05D 1/0221 |
| 2018/0151066 A1* | 5/2018 | Oba | G08G 1/096725 |
| 2019/0039618 A1* | 2/2019 | Mori | B60W 50/0098 |
| 2019/0232976 A1* | 8/2019 | Uetani | G05D 1/0061 |

FOREIGN PATENT DOCUMENTS

| | | |
|---|---|---|
| DE | 102013015349 | 4/2014 |
| DE | 102015210357 | 12/2016 |
| JP | 2014219721 | 11/2014 |
| JP | 2015215356 | 12/2015 |
| KR | 1020170025552 | 3/2017 |

\* cited by examiner (a)

(b)

(a)

(b)

(a)

(b)

(a)

(b)

(a)

(b)

(c)

(a)

(b)

(a)

(b)

(a)

(b)

(a)

(b)

(d)

(c)

(a)

(b)    (c)

VEHICLE CONTROL DEVICE MOUNTED ON VEHICLE AND METHOD FOR CONTROLLING THE VEHICLE

CROSS-REFERENCE TO RELATED APPLICATION

Pursuant to 35 USC § 119 (a), this application claims the benefit of an earlier filing date and priority to Korean Application No. 10-2017-0113318, filed on Sep. 5, 2017, the contents of which are incorporated by reference herein in its entirety.

BACKGROUND OF THE INVENTION

1. Field of the Invention

The present invention relates to a vehicle control device mounted on a vehicle and a method for controlling the vehicle.

2. Background of the Invention

A vehicle is an apparatus capable of moving a user in the user-desired direction. Typically, a representative example may be a car.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

Meanwhile, as the development of the advanced driving assist system (ADAS) is actively undergoing in recent time, development of a technology for optimizing user's convenience and safety while driving a vehicle is required.

In recent years, various technologies have been actively developed for autonomous driving of vehicles.

SUMMARY OF THE INVENTION

One aspect of the present invention is to provide a vehicle control device, capable of controlling a vehicle to autonomously travel in an optimized manner, and a method of controlling the vehicle.

Another aspect of the present invention is to provide a vehicle control device, capable of controlling a vehicle to autonomously travel based on driving related information learned through manual driving, and a method of controlling the vehicle.

Another aspect of the present invention is to provide a vehicle control device, capable of controlling a vehicle to autonomously travel by controlling an autonomous driving mode through learning and an autonomous driving mode through a sensing unit in an optimized manner, and a method of controlling the vehicle.

Another object of the present invention is to provide a vehicle control device, capable of generating new driving information using a plurality of driving information generated through learning during manual driving.

Another object of the present invention is to provide a vehicle control device, capable of autonomously running a vehicle, in which learning of driving information through manual driving is impossible or in which a sensing unit is not provided, and a method of controlling the vehicle.

The tasks to be solved in the present invention may not be limited to the aforementioned, and other problems to be solved by the present invention will be obviously understood by a person skilled in the art based on the following description.

To achieve these and other advantages and in accordance with the purpose of the present invention, as embodied and broadly described herein, there is provided a vehicle control device including a processor configured to autonomously run the vehicle using driving information that the vehicle has traveled in a manual driving mode, wherein the driving information includes a start place where the manual driving mode is started, an end place where the manual driving mode is ended, and a travel route from the start place to the end place, wherein the processor autonomously runs the vehicle along the travel route from the start place to the end place when the vehicle has moved up to the start place through manual driving.

In an embodiment, the device may further include a display unit, and the processor may output an end point corresponding to the end place on the display unit. The processor may output a start point associated with the end point on the display unit when the end point is selected, and autonomously run the vehicle along the travel route from the start place to the end place based on the driving information when the vehicle has moved up to the start place corresponding to the start point through manual driving.

In an embodiment, the processor may output at least one end point on the display unit based on that a preset condition is satisfied.

In an embodiment, the preset condition may include an entrance of the vehicle into a space where the driving information that the vehicle has traveled in the manual driving mode exists, a reception of the driving information through a communication unit, or a reception of a user request.

In an embodiment, the processor may output a plurality of end points corresponding to a plurality of end places on the display unit when the plurality of end places are searched within a predetermined distance from the vehicle, and output a start point associated with one selected end point and a travel route from the start point to the selected end point on the display unit when the one end point is selected from the plurality of end points.

In an embodiment, the remaining end points may not be output on the display unit when the one end point is selected from the plurality of end points.

In an embodiment, the processor may output a plurality of driving information on the display unit when the plurality of driving information is searched within a predetermined distance from the vehicle. The processor may autonomously run the vehicle according to one selected driving information when the one driving information is selected from the plurality of driving information, and may not output the remaining driving information except for the selected one driving information on the display unit.

In an embodiment, the processor may change driving information including the end place, based on driving information that the vehicle has traveled in the manual driving mode from a place where the vehicle is located at a time point of selecting the end point to the start place corresponding to the start point.

In an embodiment, the start place of the driving information may be changed to the place of the vehicle, and the travel route of the driving information may further include the travel route that the vehicle has traveled in the manual driving mode.

In an embodiment, the device may further include a memory configured to store the driving information that the vehicle has traveled in the manual driving mode.

In an embodiment, the device may further include a communication unit. The processor may receive the driving information from at least one of a mobile terminal and an external device through the communication unit.

In an embodiment, the processor may output screen information capable of selecting an end place on the display unit, and receive driving information including a selected end place from at least one of the mobile terminal and the external device through the communication unit when the end place is selected.

In an embodiment, the processor may generate new driving information using a plurality of different driving information when the plurality of different driving information including the end place is received.

In an embodiment, the processor may change the new driving information using driving information that the vehicle has traveled in the manual driving mode from a current position of the vehicle to a start place of the new driving information.

In an embodiment, the device may further include a sensing unit configured to sense information related to the vehicle. The processor may sense through the sensing unit whether or not an object which is not included in the driving information exists on the travel route when autonomously running the vehicle along the travel route from the start place to the end place.

In an embodiment, the device may further include a communication unit configured to receive information related to the vehicle, sensed by another vehicle. The processor may autonomously run the vehicle along the travel route based on the vehicle-related information received through the communication unit when autonomously running the vehicle along the travel route from the start place to the end place.

To achieve these and other advantages and in accordance with the purpose of the present invention, as embodied and broadly described herein, there is provided a vehicle comprising the vehicle control device described herein.

To achieve these and other advantages and in accordance with the purpose of the present invention, as embodied and broadly described herein, there is provided a method for controlling a vehicle, the method including autonomously running the vehicle using driving information that the vehicle has traveled in a manual driving mode, wherein the driving information includes a start place where the manual driving mode is started, an end place where the manual driving mode is ended, and a travel route from the start place to the end place, and wherein the autonomously running is configured to autonomously run the vehicle along the travel route from the start place to the end place when the vehicle has moved up to the start place through manual driving.

In an embodiment, the method may further include outputting an end point corresponding to the end place on the display unit, and outputting a start point associated with the end point on the display unit when the end point is selected. The autonomously running may be configured to autonomously run the vehicle along the travel route from the start place to the end place based on the driving information when the vehicle has moved up to the start place corresponding to the start point through manual driving.

In an embodiment, the outputting the end point on the display unit may be configured to output at least one end point on the display unit based on at least one of an entrance of the vehicle into a space where driving information that the vehicle has traveled in the manual driving mode exists, a reception of the driving information through the communication unit, and a reception of a user request.

The details of other embodiments are included in the detailed description and drawings.

According to an embodiment of the present invention, one or more of the following effects can be provided.

First, the present invention can provide a new autonomous driving method capable of autonomously running a vehicle based on driving-related information learned through manual driving.

Second, the present invention can provide a vehicle control device, capable of autonomously running a vehicle in at least one of a learning-based autonomous driving mode learned through manual driving and a sensor-based autonomous driving mode using a sensing unit, and a method of controlling the vehicle.

Third, the present invention can provide a new method of controlling a vehicle, capable of autonomously running the vehicle in a section, in which the vehicle cannot travel in a sensor-based autonomous driving mode, in a learning-based autonomous driving mode.

Fourth, the present invention can provide a vehicle control method, capable of autonomously running the vehicle even along a travel route on which the vehicle has not traveled in a manual driving mode, by way of generating new driving information using a plurality of learning (learned) driving information.

Fifth, the present invention can provide a vehicle control method, capable of autonomously running the vehicle along a travel route of driving information, using information related to the vehicle received from another vehicle through a communication unit even if a sensing unit is not provided.

Sixth, the present invention can provide an optimized user interface for allowing a driver to drive the vehicle in a learning-based autonomous driving mode.

The effects of the present invention are not limited to those effects mentioned above, and other effects not mentioned may be clearly understood by those skilled in the art from the description of the appended claims.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
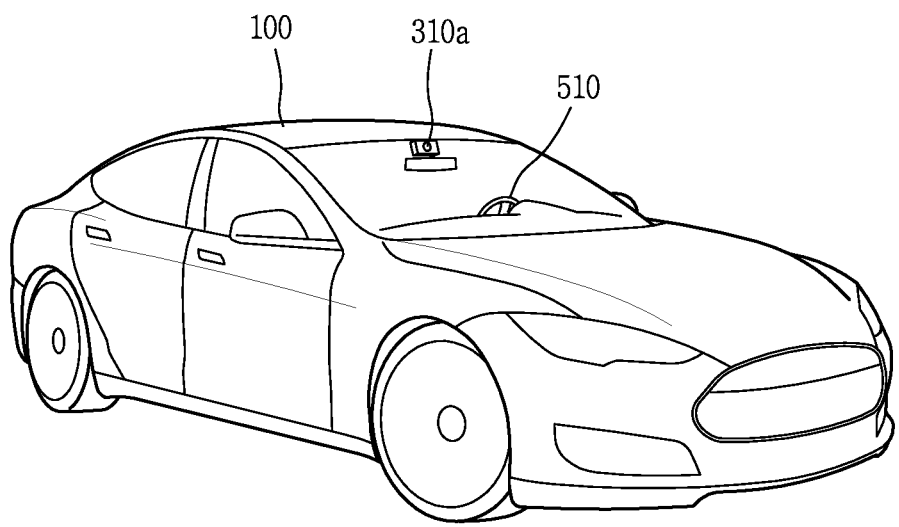
FIG. 1 is a view illustrating an appearance of a vehicle according to an embodiment of the present invention.
Figure 1:
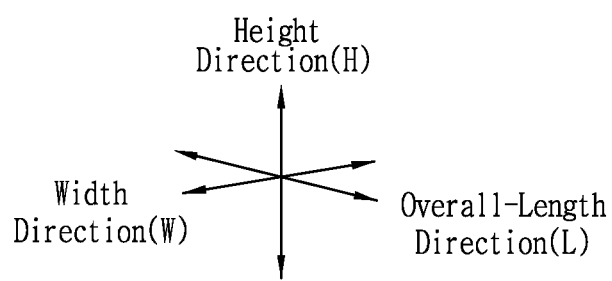

FIG. 1 is a view illustrating appearance of a vehicle in accordance with an embodiment of the present invention.

Figure 2:
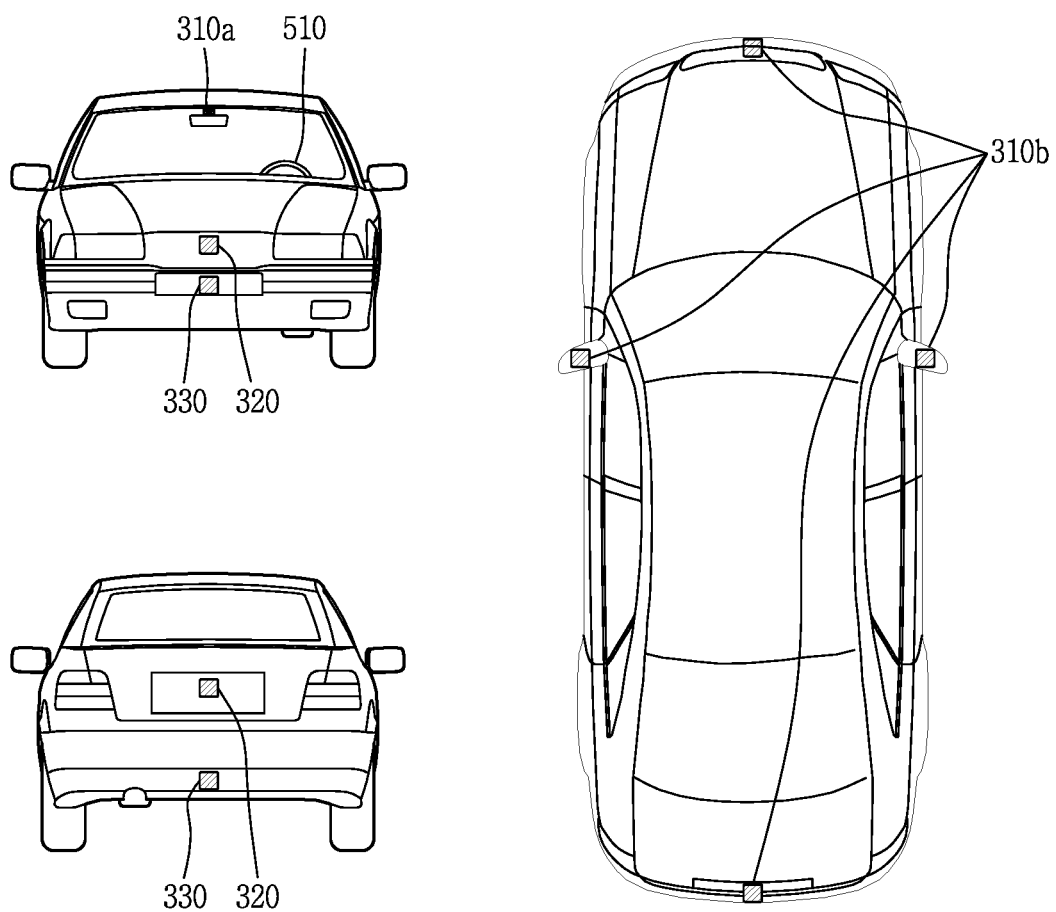
FIG. 2 is a view of a vehicle in accordance with an embodiment of the present invention, viewed from outside at various angles.

FIG. 2 is a view illustrating appearance of a vehicle at various angles in accordance with an embodiment of the present invention.

Figure 3:
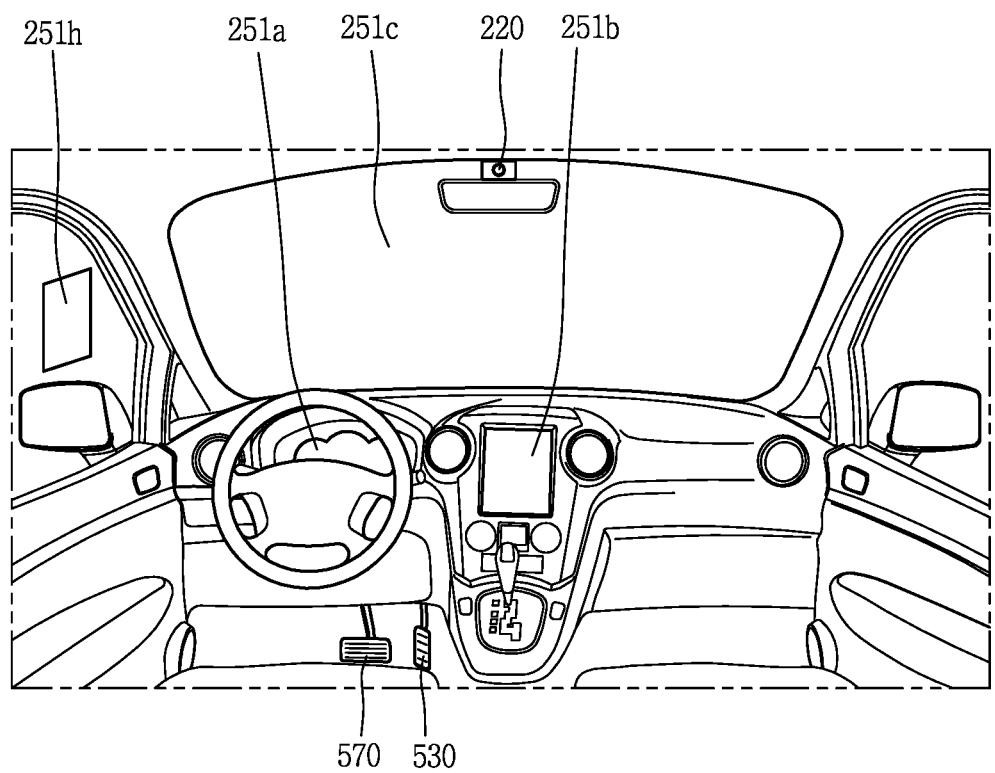
FIGS. 3 and 4 are views illustrating an inside of a vehicle according to an embodiment of the present invention.
Figure 4:
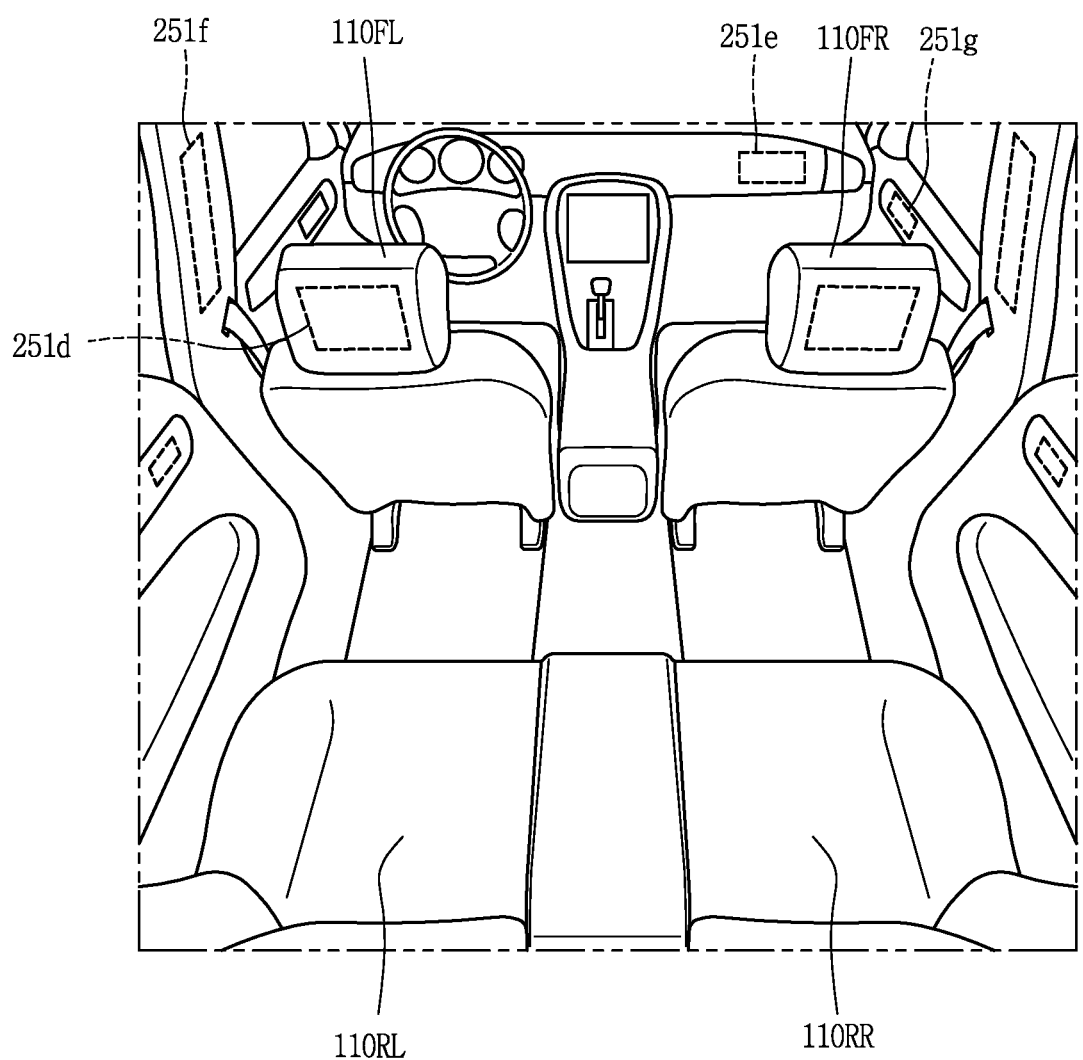

FIGS. 3 and 4 are views illustrating an inside of a vehicle in accordance with an embodiment of the present invention.

Figure 5:
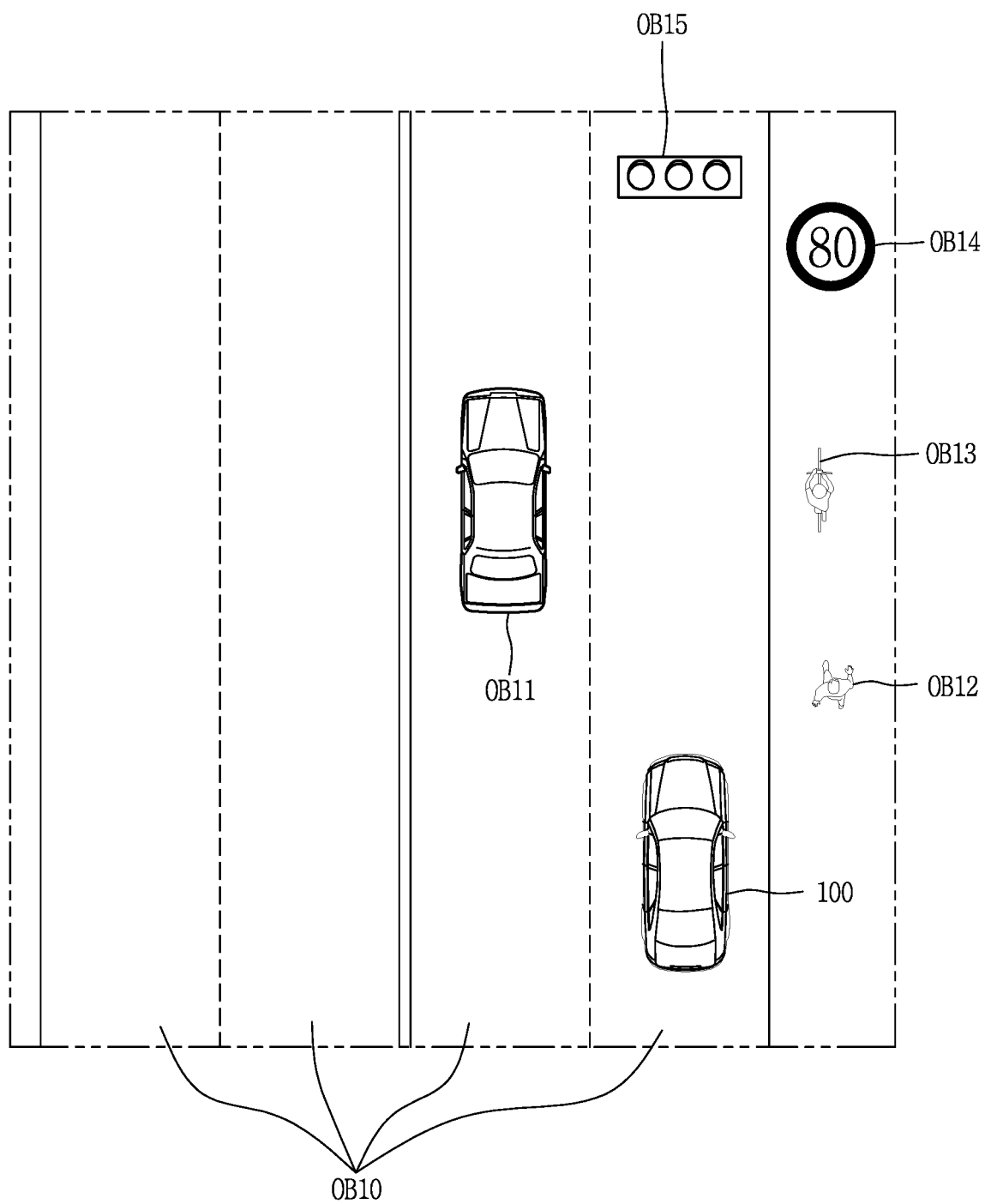
FIGS. 5 and 6 are views illustrating objects according to an embodiment of the present invention.
Figure 6:
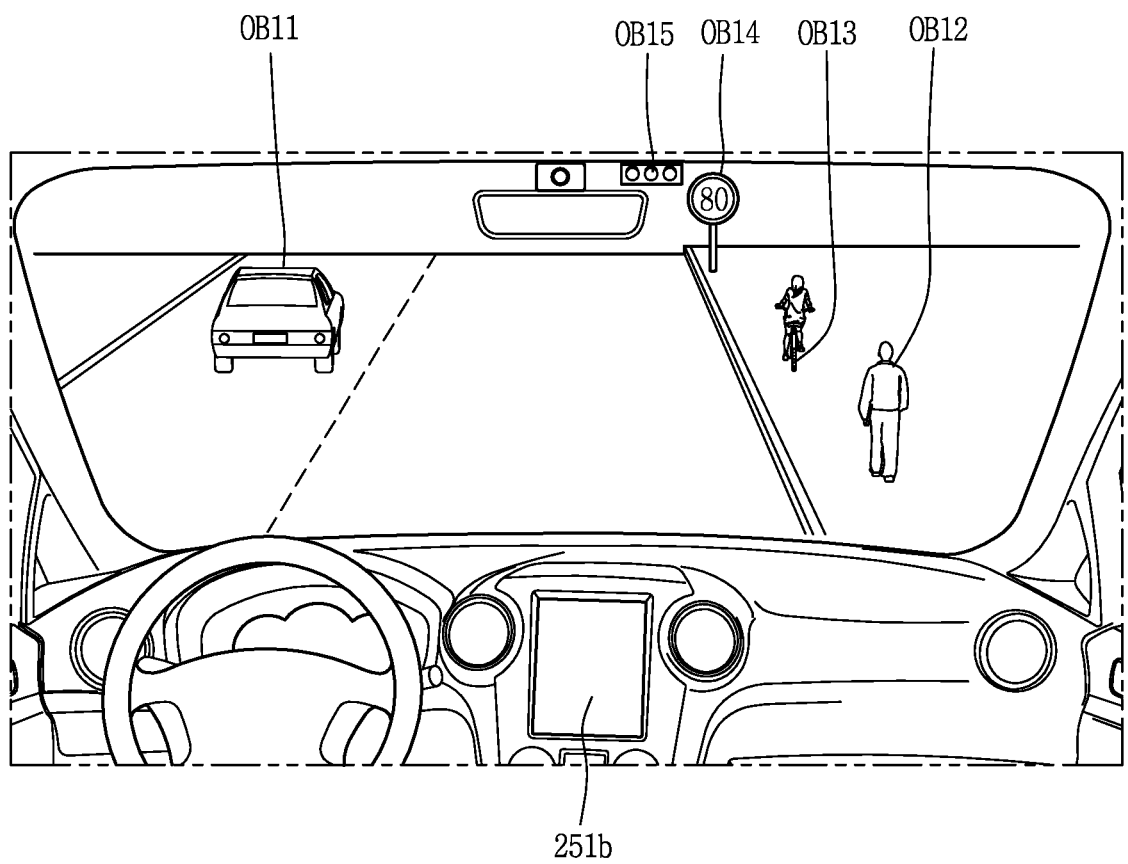

FIGS. 5 and 6 are reference views illustrating objects in accordance with an embodiment of the present invention.

Figure 7:
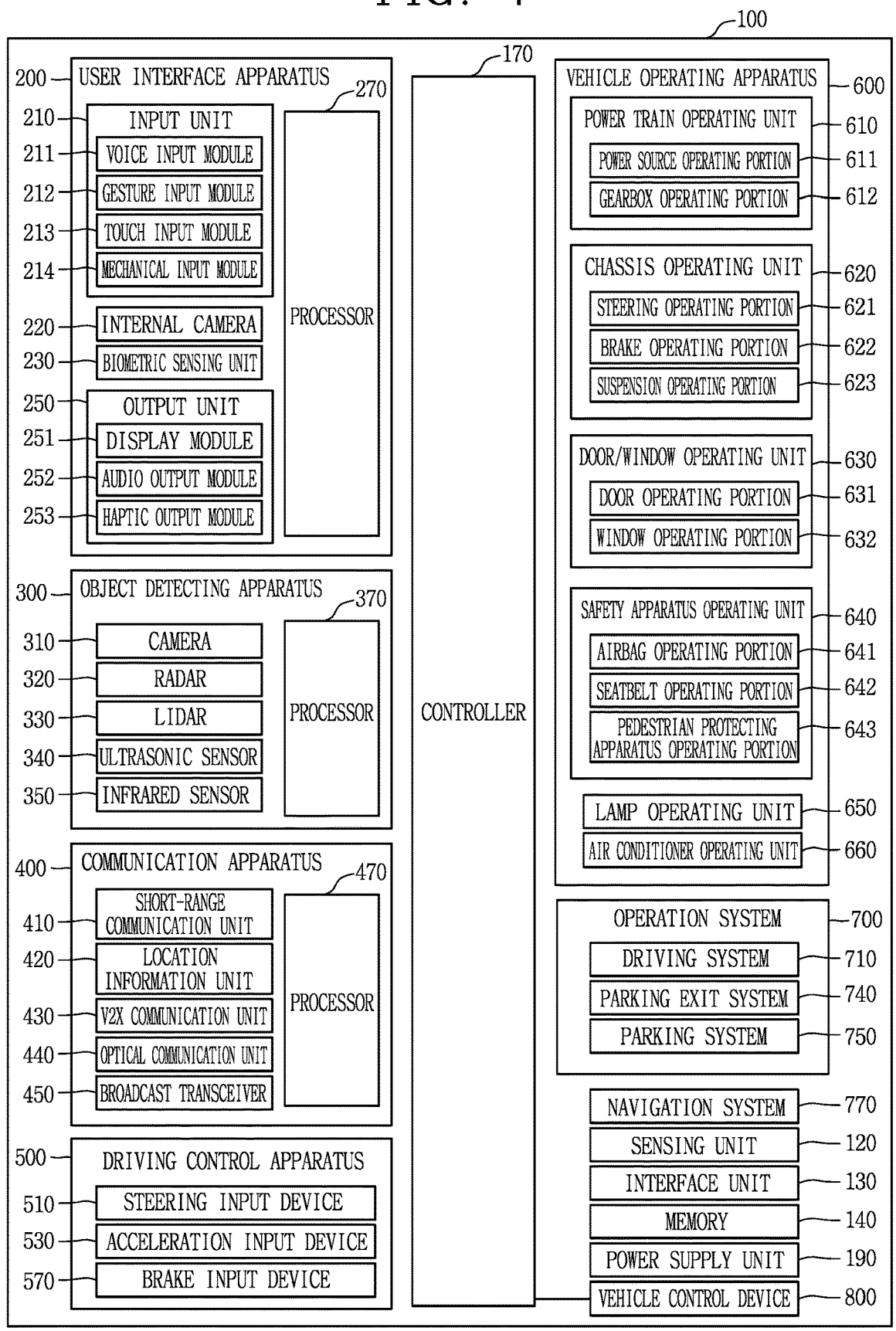
FIG. 7 is a block diagram illustrating a vehicle according to an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display. The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present invention may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Meanwhile, the vehicle control device 800 described herein may include all kinds of devices capable of controlling the vehicle, and may be, for example, a mobile terminal. When the vehicle control device 800 is a mobile terminal, the mobile terminal and the vehicle 100 may be connected to each other so as to perform communication in a wired/wireless manner. In addition, the mobile terminal may control the vehicle 100 in various ways in a communication-connected state.

When the vehicle control device 800 is a mobile terminal, the processor 870 described herein may be a controller of the mobile terminal.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of the components included in the vehicle control device 800 according to an embodiment of the present invention with reference to the accompanying drawings.

Figure 8:
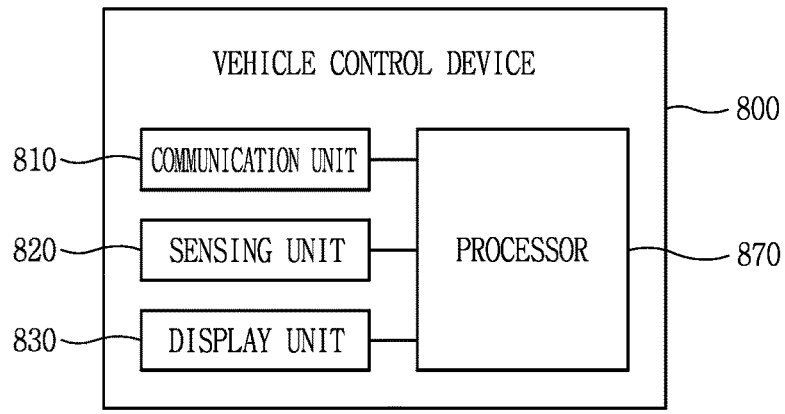
FIG. 8 is a conceptual view illustrating a vehicle control device according to an embodiment of the present invention.

FIG. 8 is a conceptual view illustrating a vehicle control device according to an embodiment of the present invention.

As illustrated in FIG. 8, the vehicle control device 800 according to the present invention may include a communication unit 810, a sensing unit 820, a display unit 830, a memory (not illustrated), a processor 870 and the like.

First, the vehicle control device 800 according to the present invention may include a communication unit 810.

The communication unit 810 may be the communication device 400 described above. The communication unit 810 may be connected to a mobile terminal present inside the vehicle 100 to perform communication with the mobile terminal.

In one example, the vehicle control device 800 (or vehicle 100) and the mobile terminal may be connected to each other to allow wireless communication therebetween through the communication unit 810. The vehicle control device 800 and the mobile terminal may be wirelessly connected to each other so as to enable wireless communication with each other according to a user request. Or, if they have been connected before to allow the wireless communication, the vehicle control device and the mobile terminal may be wirelessly connected to enable the wireless communication therebetween, in response to an entrance of the mobile terminal into the vehicle.

The communication unit 810 may be provided in the vehicle (or in the vehicle control device), or may be formed in a form of a separate module so as to perform communication with (to be electrically coupled to) components of the vehicle.

The vehicle control device 800 may control a mobile terminal 900 through the communication unit 810.

Specifically, the vehicle control device 800 may transmit a control signal to the mobile terminal 900 through the communication unit 810 so as to control the mobile terminal 900. The mobile terminal 900 may perform a function/operation/control corresponding to the control signal when the control signal is received.

Conversely, the present invention may enable the mobile terminal 900 to control the vehicle control device 800 (or the vehicle 100). Specifically, the mobile terminal 900 may transmit a control signal for controlling the vehicle to the vehicle control device 800. In response to this, the vehicle control device 800 may perform the function/operation/control corresponding to the control signal transmitted from the mobile terminal 900.

The communication unit 810 may perform communication with an external device (for example, a server, a cloud server (or a cloud), the Internet, etc.) existing outside the vehicle. The communication unit 810 may perform communication with another vehicle.

In addition, the vehicle control device 800 related to the present invention may include a sensing unit 820. The sensing unit 820 may be the object detecting apparatus 300 described with reference to FIG. 7 or the sensing unit 120 provided in the vehicle 100.

The sensing unit 820 may also be implemented in combination of at least two of the camera 310, the radar 320, the LiDAR 330, the ultrasonic sensor 340 and the infrared sensor 350 provided in the object detecting apparatus 300, and the sensing unit 120.

The sensing unit 820 may sense information related to the vehicle 100 of the present invention.

The information related to the vehicle may be at least one of vehicle information (or a driving status of the vehicle) and surrounding information related to the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parting mode, automatic parking mode, manual parking mode), whether or not a user is present in the vehicle, information associated with the user (for example, whether or not the user is an authenticated user), and the like.

The surrounding information of the vehicle, for example, may be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, ambient brightness of the vehicle, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information (or surrounding environment information) of the vehicle may include external information related to the vehicle (e.g., ambient brightness, temperature, a position of the sun, information related to nearby subject (a person, another vehicle, a sign, etc.), a type of a driving road surface, a landmark, line information, and driving lane information), and information required for an autonomous driving/autonomous parking/automatic parking/manual parking mode.

In addition, the surrounding information may further include a distance from an object existing around the vehicle to the vehicle 100, a type of the object, a parking space for the vehicle, an object for identifying the parking space (for example, a parking line, a string, another vehicle, a wall, etc.), and the like.

Further, the information related to the vehicle may include whether or not a mobile terminal is placed in a rack provided in the vehicle, whether or not the mobile terminal has entered (exists) in the vehicle, whether the mobile terminal has entered (exists) within a predetermined distance from the vehicle, whether or not the mobile terminal and the vehicle control device are connected to each other to enable communication therebetween, and the like.

The information related to the vehicle sensed through the sensing unit 820 may be used in an autonomous driving mode for autonomous driving of the vehicle. Specifically, the processor 870 may control the vehicle to travel in an autonomous driving mode, by using information related to the vehicle sensed through the sensing unit 820.

In addition, the vehicle control device 800 related to the present invention may include a display unit 830.

The display unit 830 included in the vehicle control device 800 according to the present invention, which is a display device provided in the vehicle 100, may be the display module 251 described above.

The processor 830 may be the output unit 250 or the display module 251 illustrated in FIG. 7. The display unit 830 may include an output unit (e.g., a touch screen) of a mobile terminal that can perform communication with the communication device 400.

The display unit 830 may include a transparent display. The transparent display may be attached to the windshield or the window.

The display module 830 may be disposed on one area of a steering wheel, one area 251a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

For example, the display unit 830 may include a cluster, a center fascia (CID), a navigation device, a head-up display (HUD), and the like.

The display unit 830 may have an inter-layered structure or an integrated structure with a touch sensor in order to implement a touch screen. The touch screen may function as the user input unit 210 which provides an input interface between the vehicle 100 (or the vehicle control device 800) and the user and simultaneously provide an output interface between the vehicle 100 (or the vehicle control device 800) and the user.

The processor 870 may output various information related to the vehicle to the display unit 830. In addition, the processor 870 may output the information related to the vehicle to a different position of the display unit 830 according to a type of information related to the vehicle.

Various information output to the display unit 830 will be described later in detail with reference to the accompanying drawings.

The display unit 830 may be a navigation system 770 (or a navigation device). Also, the display unit 830 may include a navigation system 770.

That is, the display unit 830 may refer to a navigation device provided in the vehicle 100. The navigation device may be built in the vehicle 100 from shipment of the vehicle 100 or a navigation device mounted by the user.

The display unit 830 may refer to a navigator for a vehicle, and may be a navigation system independent of the navigation system provided by the mobile terminal 900.

The description of the display unit 830 in this specification may be applied to a navigation system 770, a navigation device, or a navigator for vehicle in the same or similar manner.

In addition, the vehicle control device 800 related to the present invention may include a sensing unit 820.

The memory may be the memory 140 described in FIG. 7.

Various information may be stored (recorded) in the memory. For example, information related to the vehicle sensed through the sensing unit 820 may be stored in the memory 140.

The memory may be configured to store, change or delete information under the control of the processor 870.

On the other hand, the memory may store therein driving-related information learned through manual driving, under the control of the processor 870, when the vehicle travels in a manual driving mode.

The driving-related information may include driving (running, traveling, or moving) information that the vehicle travels in the manual driving mode.

The learning described herein may include the meaning of storage, recording or generation. For example, learning the driving-related information or driving information through manual driving may indicate (mean) storing driving information that the vehicle has traveled in the manual driving mode (or the vehicle has obtained during the manual driving mode) in the memory, storing (generating, recording) driving-related information that the vehicle has traveled in the manual driving mode, and the like.

Contents related to the traveling or driving (or driving information) will be described in more detail with reference to the accompanying drawings.

The driving-related information learned through the manual driving (or the driving information that the vehicle has traveled in the manual driving mode) may be used in the autonomous driving mode of the vehicle.

Meanwhile, the vehicle control device 800 of the present invention may include the processor 870 for controlling the communication unit 810, the sensing unit 820, the display unit 830, the memory (not illustrated), and the like.

The processor 870 may be the controller 170 described in FIG. 7.

The processor 870 may control the components described in FIG. 7 and the components described in FIG. 8.

In addition, the processor 870 may store driving information that the vehicle 100 has traveled in the manual driving mode (driving-related information that the vehicle 100 has learned through manual driving) in the memory. Thereafter, the processor 870 may drive the vehicle 100 in the autonomous driving mode based on the stored driving information (or the driving-related information).

Hereinafter, with reference to the accompanying drawings, an optimized method for autonomously driving the vehicle of the present invention will be described in more detail.

Figure 9:
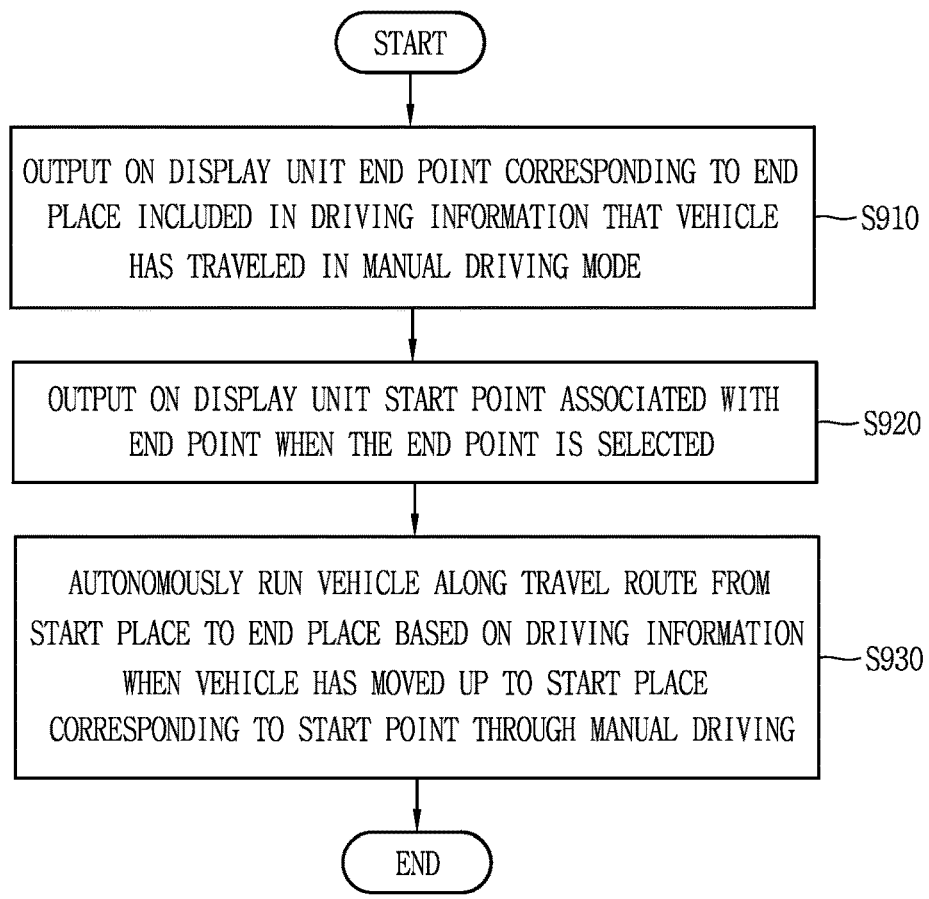
FIG. 9 is a flowchart illustrating a representative control method according to the present invention.

FIG. 9 is a flowchart illustrating a typical control method according to the present invention, and FIGS. 10, 11, 12, 13A, 13B, 13C, 14, 15 and 16 are conceptual views illustrating the control method illustrated in FIG. 9.

First, the vehicle control device 800 according to the present invention may include a step of autonomously driving the vehicle using driving information that the vehicle has traveled in the manual driving mode.

Here, the driving information that the vehicle has traveled in the manual driving mode may refer to driving information that the vehicle or another vehicle has manually traveled from a first point to a second point in the manual driving mode.

Here, the first point refers to a start point (S/P) from which the manual driving starts in the manual driving mode and the second point refers to an end point (E/P) at which the manual driving in the manual driving mode has ended.

That is, the driving information that the vehicle has traveled in the manual driving mode may include a start place (a start place or a start position) where the manual driving mode is started, an end place (or an end place) where the manual driving mode is terminated, and a travel route (or a travel path) from the start place to the end place.

The processor 870 may autonomously run the vehicle 100 along the travel route from the start place to the end place when the vehicle 100 travels up to the start place in the manual driving mode.

That is, in this specification, autonomously driving the vehicle using the driving information that the vehicle has traveled in the manual driving mode may refer to driving the vehicle along the travel route included in the driving information from the start place to the end place included in the driving information.

In addition, the vehicle control device 800 related to the present invention may learn the driving information that the vehicle has traveled in the manual driving mode. Here, the learning may refer to generating information (i.e., driving-related information) that the vehicle travels in the manual driving mode, and storing the generated information in the memory.

The driving information that the vehicle has traveled in the manual driving mode may be generated by another vehicle, and received from the another vehicle or an external device (for example, a server, the Internet, a cloud server, a mobile terminal, etc.) through the communication unit 810.

The process of learning (storing) the driving information that the vehicle has traveled in the manual driving mode will be described in more detail.

The processor 870 of the present invention may store the driving-related information learned through manual driving in the memory. As described above, learning the driving-related information may include the meaning of storing the driving information that the vehicle has traveled in the manual driving mode.

That is, the driving-related information may include driving information (or travel route information or travel path information).

The processor 870 may store in the memory the driving information that the vehicle has traveled in the manual driving mode.

Specifically, the processor 870 may store in the memory the driving information that the vehicle 100 has traveled in the manual driving mode from a first point (a start place) to a second point (an end place) different from the first point.

Further, the processor 870 may run the vehicle in the autonomous driving mode based on the stored driving information, in response to the vehicle 100 arriving at the first point.

That is, the processor 870 may control the vehicle 100 to autonomously travel on the basis of the stored driving information when the driving information that the vehicle has traveled in the manual driving mode from the first point to the second point is stored in the memory and thereafter the vehicle is located at the first point again.

At this time, the processor 870 may run the vehicle autonomously in the same driving manner that the vehicle has traveled in the manual driving mode, on the basis of the stored driving information.

That is, autonomously driving the vehicle based on the driving information stored in the memory (or the driving information received through the communication unit) may refer to autonomously driving the vehicle in the same driving manner (along the driving route, or along the driving pattern) that the vehicle has traveled in the manual driving mode, other than autonomously driving the vehicle while generating a real-time autonomous travel route using sensors.

In other words, in this specification, autonomously driving the vehicle based on the driving information stored in the memory may refer to driving the vehicle in the autonomous driving mode in the same driving manner (or the same driving mode) that the vehicle has traveled in the manual driving mode, based on the driving information that the vehicle has traveled in the manual driving mode.

That is, the processor 870 may control the vehicle to autonomously travel in the same driving manner in which the vehicle has traveled in the manual driving mode, by using the driving information that the vehicle has traveled in the manual driving mode.

On the other hand, the processor 870 may autonomously drive the vehicle along a driving route (a travel route or a travel path) along which the vehicle has traveled in the manual driving mode, by using the driving information that the vehicle has traveled in the manual driving mode.

In case where the vehicle is driven in the autonomous driving mode based on the driving information that the vehicle has traveled in the manual driving mode, when the vehicle of the present invention is traveling in a specific section (for example, a section between the first point and the second point), the vehicle may autonomously travel the specific section along the same trajectory (course or route), or autonomously travel the specific section repetitively in the same driving manner (or driving pattern) every time.

The driving information (travel route information) that the vehicle has traveled in the manual driving mode may include at least one of travel trajectory information that the vehicle has traveled or travel pattern information regarding the vehicle.

The travel trajectory information may include position information related to a plurality of points at which the vehicle has been located. In detail, the travel trajectory information may refer to a manual driving path of the vehicle 100 connecting a plurality of points that the vehicle 100 has traveled in the manual driving mode.

The processor 870 may generate the travel trajectory information regarding the vehicle which has traveled in the manual driving mode, using position information related to the vehicle received through the location information unit.

In addition, the processor 870 may generate the travel trajectory information regarding the vehicle using the number of turns of wheels of the vehicle which is currently traveling in the manual driving mode, angles of the wheels, etc., even without using the location information unit. At this time, the first point (the start point) and the second point (the end point) may be determined by the location information unit.

In addition, the travel pattern information may include at least one of steering angle information (a rotation angle of a steering wheel) for each of the plurality of points or speed information (vehicle speed) for each of the plurality of points.

In addition, the travel pattern information may include whether an accelerator pedal has been pressed, a pressed degree of the accelerator pedal, whether or not a brake pedal has been pressed, a pressed degree of the brake pedal, or the like, with respect to each of the plurality of points.

That is, the travel pattern information may be associated with whether or not the brake pedal has been pressed, whether or not the accelerator pedal has been pressed, the pressed degree of the brake pedal, or the pressed degree of the accelerator pedal, with respect to each point of the travel trajectory.

Since the driving-related information described above includes the driving information (or the travel route information), the driving-related information may include at least one of the travel trajectory information (the position information related to the plurality of points) or the travel pattern information (the steering angle information or the speed information for each of the plurality of points).

In addition, the driving-related information (or the driving information that the vehicle has traveled in the manual driving mode) may include sensor data sensed by the sensing unit 820 when the vehicle travels in the manual driving mode.

The sensor data may include vehicle-related information sensed at each point where the vehicle travels in the manual driving mode.

The sensor data may include the aforementioned vehicle-related information. In addition, the processor 870 may associate (link) the sensor data with each point (or each time point (time basis)) of the vehicle traveling in the manual driving mode.

The processor 870 may store (generate) driving information that the vehicle 100 has traveled in the manual driving mode in the memory, based on that a status of the vehicle 100 satisfies a preset condition. The preset condition may refer to a condition associated with a function of starting to store in the memory the driving information that the vehicle has traveled in the manual driving mode.

The preset condition may include various conditions, for example, the following conditions.

For example, when a user request is received, the processor 870 may start to store (generate) the driving information that the vehicle has traveled in the manual driving mode. That is, the processor 870 may store (or may start to store) in the memory the driving information (the driving-related information) that the vehicle has traveled in the manual driving mode, based on the user request.

As another example, when the vehicle reaches a point where autonomous driving of the vehicle using the sensing unit 820 is not allowed (or when the vehicle enters a road where autonomous driving of the vehicle using the sensing unit 820 is impossible), the processor 870 may store (or start to store) in the memory the driving information that the vehicle has traveled in the manual driving mode.

As another example, the processor 870 may store (or start to store) in the memory the driving information that the vehicle has traveled in the manual driving mode when location information related to the vehicle is not received through the communication device 400 (i.e., GPS information is not received).

As another example, the processor 870 may store (or start to store) in the memory the driving information that the vehicle has traveled in the manual driving mode when a surrounding environment of the vehicle 100 is in a state that the autonomous driving of the vehicle using the sensing unit 820 is not allowed.

As another example, the processor 870 may store (or start to store) in the memory new driving information that the vehicle travels in the manual driving mode when sensor data included in the driving-related information (or the driving information that the vehicle has traveled in the manual driving mode) is different from sensor data which is sensed through the sensing unit 820 while the vehicle travels in the autonomous driving mode according to the driving information that the vehicle has traveled in the manual driving mode, namely, which has been stored in the memory.

The sensor data may be different in various cases, such as a new object sensed, an existing object disappearing, a road disappearing, a road deformed, or a road traveled in the manual driving mode blocked due to an obstacle, and the like.

The sensor data may include surrounding environment information related to the vehicle when the vehicle travels in the manual driving mode. The processor 870 may store the surrounding environment information related to the vehicle traveled in the manual driving mode in the memory in a manner of being included the driving information using the sensor data.

Further, the processor 870 may generate map data of the vehicle traveled in the manual driving mode using sensor data. For example, the map data may be generated based on information related to nearby objects (e.g., trees, signs, buildings or road conditions (e.g., an unpaved-road, a road with snow or leaves, etc.)

The processor 870 may generate map data using sensor data, and generate driving information by linking (associating) travel trajectory information or travel pattern information that the vehicle has traveled in the manual driving mode with the map data.

In addition, the processor 870 may store in the memory the driving information generated in the manner that the travel trajectory information or travel pattern information that the vehicle has traveled in the manual driving mode is associated with the map data.

In addition, the processor 870 may store in the memory the driving information that the vehicle has traveled in the manual driving mode according to various situations.

That is, when a state of the vehicle 100 satisfies a preset condition, the processor 870 may start to learn about the driving information that the vehicle has traveled in the manual driving mode (that is, starting to learn about driving-related information by manual traveling).

The processor 870 may determine a point (position), at which the vehicle 100 is located when the state of the vehicle 100 satisfies the preset condition, as a first point. That is, the first point may refer to a start point of the driving information that the vehicle has traveled in the manual driving mode.

The driving information (driving-related information) stored in the memory may be in plurality, and the first point may be varied according to the point (position) at which the vehicle 100 is located at the time point of satisfying the preset condition On the other hand, the processor 870 may determine a point, at which the vehicle 100 is located when the state of the vehicle satisfies a specific condition, as a second point. That is, the second point may refer to an end point of the driving information that the vehicle has traveled in the manual driving mode.

The specific condition may include, for example, that the vehicle is turned off, the vehicle is stopped for a predetermined time, a door of the vehicle is opened after the vehicle is turned off, a new user input is received, and the like.

The second point may vary according to the point of the vehicle 100 at the time of satisfying the specific condition.

Hereinafter, for convenience of explanation, it is assumed that information used for the vehicle to perform the autonomous driving mode is driving information (travel route information) that the vehicle has traveled in the manual driving mode. That is, in the following description, it may be understood that running the vehicle in the autonomous driving mode based on the driving information that the vehicle has traveled in the manual driving mode refers to running the vehicle in the autonomous driving mode based on information related to driving learned through manual driving.

The processor 870 may autonomously run the vehicle based on the driving information that the vehicle has traveled in the manual driving mode. At this time, the autonomous driving of the vehicle according to the driving information that the vehicle has traveled in the manual driving mode may be named as learning autonomous driving, a learning autonomous driving mode, learning-based autonomous driving, a learning-based autonomous driving mode, and the like.

At this time, the processor 870 may autonomously run the vehicle using (based on) sensor data included in the driving information (or the driving-related information) stored in the memory.

For example, the processor 870 may autonomously run the vehicle based on the driving information stored in the memory in a driving manner in which the vehicle has traveled in the manual driving mode. At this time, the processor 870 may stop autonomous driving (learning-based autonomous driving) when sensor data included in the driving information stored in the memory is different from sensor data sensed through the sensing unit 820 during the autonomous driving. In this case, the vehicle may be stopped.

In addition, while the vehicle autonomously travels according to driving information stored in the memory, when it is detected that sensor data included in the driving information stored in the memory is different from sensor data sensed through the sensing unit 820 during the autonomous driving, the processor 870 may output notification information to notify that a driver should switch the driving mode to the manual driving mode.

On the other hand, autonomous driving of the vehicle based on the vehicle-related information sensed through the sensing unit 820 may be referred to as sensor autonomous driving, a sensor autonomous driving mode, sensor-based autonomous driving, a sensor-based autonomous driving mode, and the like.

Thereafter, the processor 870 may drive the vehicle in the autonomous driving mode based on a stored travel route. In detail, when driving information that the vehicle has traveled in the manual driving mode is stored in the memory (or when driving information that the vehicle has traveled in the manual driving mode is received through the communication unit 810), the processor 870 may control the vehicle to travel in the autonomous driving mode based on the driving information. Here, driving the vehicle in the autonomous driving mode based on the stored driving information may be understood as learning-based autonomous driving.

The vehicle control device 800 related to the present invention may control the vehicle to autonomously travel in various manners when autonomously running the vehicle in the learning-based autonomous driving mode.

In detail, the processor 870 may control the vehicle 100 to autonomously travel based on one of a first manner of autonomously running the vehicle using only travel trajectory information included in driving information stored in the memory, and a second manner of autonomously running the vehicle 100 using the travel trajectory information and travel pattern information included in the driving information.

For example, the processor 870 may autonomously drive the vehicle using only the travel trajectory information included in the driving information that the vehicle has traveled in the manual driving mode (the first manner).

In this case, the vehicle 100 may autonomously travel based on the travel trajectory information in a manner that the vehicle has steering angle information and speed information which are different from steering angle information or speed information for each of a plurality of points when storing (learning) the driving information.

That is, the processor 870 may autonomously run the vehicle in such a manner that the vehicle moves along only a trajectory that the vehicle has traveled when storing (learning) the driving information and the steering angle and the speed are different from those when storing (learning) the driving information.

At this time, the processor 870 may determine the steering angle and the speed using the travel trajectory information and vehicle-related information sensed through the sensing unit, and autonomously run the vehicle according to the determined steering angle and speed.

As another example, the processor 870 may autonomously drive the vehicle according to the travel trajectory information and the travel pattern information included in the driving information (the second manner).

In this case, the processor 870 may autonomously drive the vehicle so as to have the same trajectory, steering angle, and speed as route (path) information that the vehicle has traveled in the manual driving mode. That is, the processor 870 may autonomously drive the vehicle 100 so as to make the same trajectory and travel pattern as those when learning the driving information.

On the other hand, the processor 870 may use the vehicle-related information sensed through the sensing unit 820, even though the vehicle travels autonomously in the second manner. This may result from an occurrence of cases such as a change to a different environment from that when storing (learning) driving information, a presence of an obstacle or a change of a road. In this case, when the vehicle travels autonomously in the second manner, an accident may be likely to happen.

Accordingly, even if the vehicle travels autonomously according to the travel trajectory information and the travel pattern information included in the driving information, the processor 870 may stop the autonomous driving when an obstacle is detected through the sensing unit 820 or a road is changed (or when a road is changed to a road along which the vehicle is impossible to move).

At this time, the processor 870 may output to the driver notification information indicating that the vehicle cannot be driven in the autonomous driving mode or notification information guiding switching to the manual driving mode.

When performing the learning-based autonomous driving, whether to autonomously drive the vehicle in the first manner or the second manner may be decided according to various conditions.

For example, on the basis of a current position of the vehicle 100, the processor 870 may autonomously run the vehicle in the first manner when the autonomous driving can be performed in the first manner, and autonomously run the vehicle in the second manner when the autonomous driving can be performed in the second manner.

As another example, when the vehicle 100 is located at a position where the vehicle can autonomously travel in both of the first manner and the second manner, the processor 870 may output through the output unit information for checking whether to autonomously run the vehicle in the first manner or the second manner, and autonomously drive the vehicle in one of the first and second manners based on a user input.

As another example, the processor 870 may autonomously run the vehicle in any one of the first and second manners, based on whether or not the driver has boarded the vehicle 100.

For example, the processor 870 may autonomously run the vehicle in the first manner when the driver has boarded the vehicle 100, and autonomously run the vehicle in the second manner when the driver is not aboard the vehicle 100.

In another example, the processor 870 may autonomously run the vehicle in any one of the first and second manners based on whether or not the vehicle has traveled in the sensor-based autonomous driving mode before the vehicle autonomously travels in the learning-based autonomous driving mode.

For example, the processor 870 may autonomously run the vehicle in the first manner when the vehicle has traveled in the sensor-based autonomous mode before autonomously running in the learning-based autonomous driving mode. This may be considered as ensuring reliability of the sensor.

On the other hand, the processor 870 may autonomously run the vehicle in the second manner when the vehicle has not traveled in the sensor-based autonomous driving mode before the vehicle autonomously travels in the learning-based autonomous driving mode.

In addition, the processor 870 may autonomously run the vehicle in the first manner when a preset situation occurs (for example, when an obstacle appears or a road is changed) while autonomously running the vehicle in the second manner.

Figure 10:
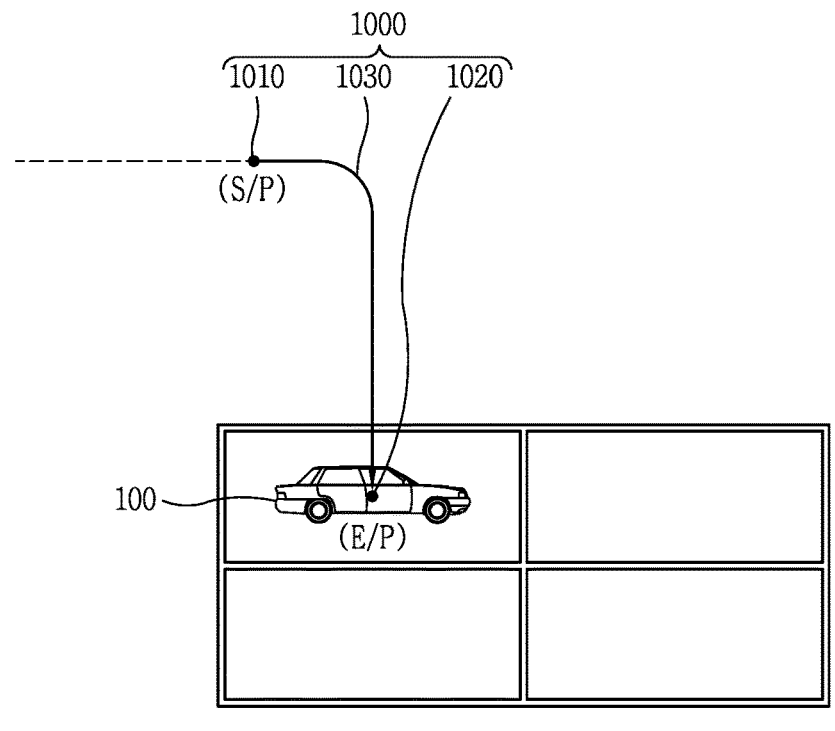
FIGS. 10, 11, 12, 13A, 13B, 13C, 14, 15 and 16 are conceptual views illustrating the control method illustrated in FIG. 9.
Figure 10:
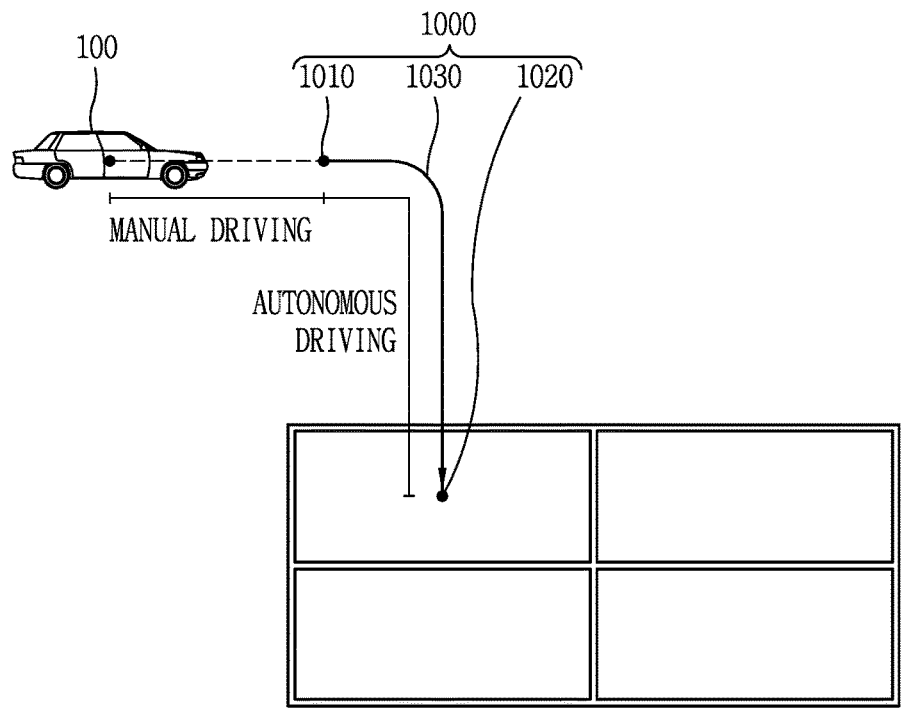

The foregoing description will be obviously understood with reference to FIG. 10.

Referring to FIG. 10, the processor 870 may store in the memory driving information that the vehicle has traveled in the manual driving mode.

For example, as illustrated in (a) of FIG. 10, the processor 870 may store in the memory, as driving information 1000, a travel route 1030 along which the vehicle has traveled in the manual driving mode from a start place (start point) 1010 to an end place (end point) 1020.

In addition, the processor 870 may receive driving information that another vehicle has traveled in the manual driving mode from a mobile terminal or an external device through the communication unit 810.

The driving information 1000 that the vehicle has traveled in the manual driving mode may include a start place (S/P) 1010 where the manual driving mode is started, an end place (E/P) 1020 where the manual driving mode is ended, and a travel route 1030 from the start place 1010 to the end place 1020.

Afterwards, as illustrated in (b) of FIG. 10, when the vehicle 100 manually travels up to the start place 1010, the processor 870 may autonomously run the vehicle 100 from the start place 1010 to the end place 1020 along the travel route 1030.

For example, when driving information that the vehicle has traveled in the manual driving mode is currently present around the vehicle 100 and the vehicle 100 is located at a start place of the driving information, the processor 870 may autonomously run the vehicle 100 up to an end place of the driving information along a travel route included in the driving information.

On the other hand, when there is a plurality of different driving information around the vehicle 100, the present invention may provide a user interface for vehicle, which is provided to select one driving information more effectively so as to autonomously run the vehicle along the selected driving information.

Referring to FIG. 9, in the present invention, an end point corresponding to an end place included in driving information that the vehicle has traveled in the manual driving mode is output on the display unit 830 (S910).

The processor 870 may output the end point corresponding to the end place included in the driving information on the display unit 830.

At this time, the processor 870 may output at least one end point on the display unit 830 on the basis of a satisfaction of a preset condition.

Here, the number of end points may correspond to the number of driving information existing within a predetermined distance from a current position of the vehicle.

Figure 11:
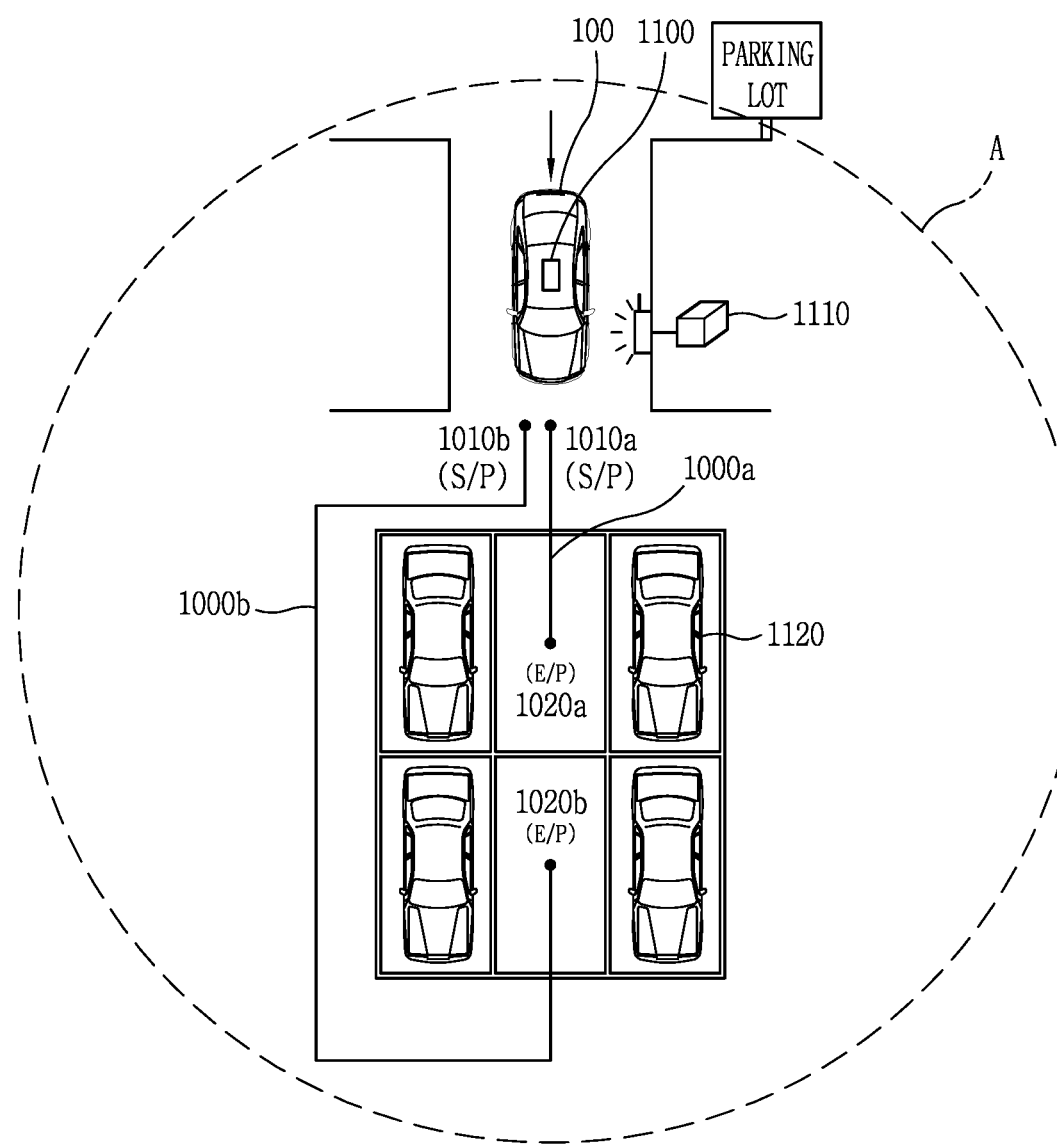

Referring to FIG. 11, the preset condition may include a case where the vehicle 100 enters a space A where driving information 1000a, 1000b that the vehicle has traveled in the manual driving mode exists.

Here, the space A may include various spaces such as a parking lot, a vicinity of a vehicle owner's house, a space where the vehicle can be stopped (for example, a sleeping shelter, a rest area), and the like.

When driving information that the vehicle has traveled in the manual driving mode (i.e., driving information learned through manual driving) exists in the space A and the vehicle 100 enters the space A, the processor 870 may output at least one end point on the display unit 830 based on the driving information existing in the space A (or associated with the space A).

Here, outputting the at least one end point on the display unit 830 is to inform the driver that autonomous driving is possible in the space which the vehicle currently enters, or to allow the driver to select a final position of the vehicle when there is a plurality of driving information.

In addition, the preset condition may include that the driving information that the vehicle has traveled in the manual driving mode is received through the communication unit 810.

As described above, the driving information that the vehicle has traveled in the manual driving mode may be also prestored in the memory through manual driving performed by the vehicle 100 before. However, the driving information in the manual driving mode may include driving information learned through manual driving of another vehicle.

This driving information is received from a mobile terminal 1100 through the communication unit 810, received from a server 1110 linked with the space A which the vehicle has entered, received from another vehicle 1120, or received through an external server such as the Internet, a cloud, or the like.

When the driving information is received through the communication unit 810, the processor 870 may output an end point corresponding to an end place included in the received driving information on the display unit 830.

At this time, the processor 870 may request an external device to transmit driving information that the vehicle has traveled in the manual driving mode, in response to a user request for requesting for the driving information from the external device through the communication unit 810 being received through the display unit 830 or the user input unit.

In addition, when the driving information that the vehicle has traveled in the manual driving mode is received through the communication unit 810, the processor 870 may output the end point corresponding to the end place included in the driving information on the display unit 830 based on a user request.

In addition, the preset condition may be a reception of a user request.

Figure 12:
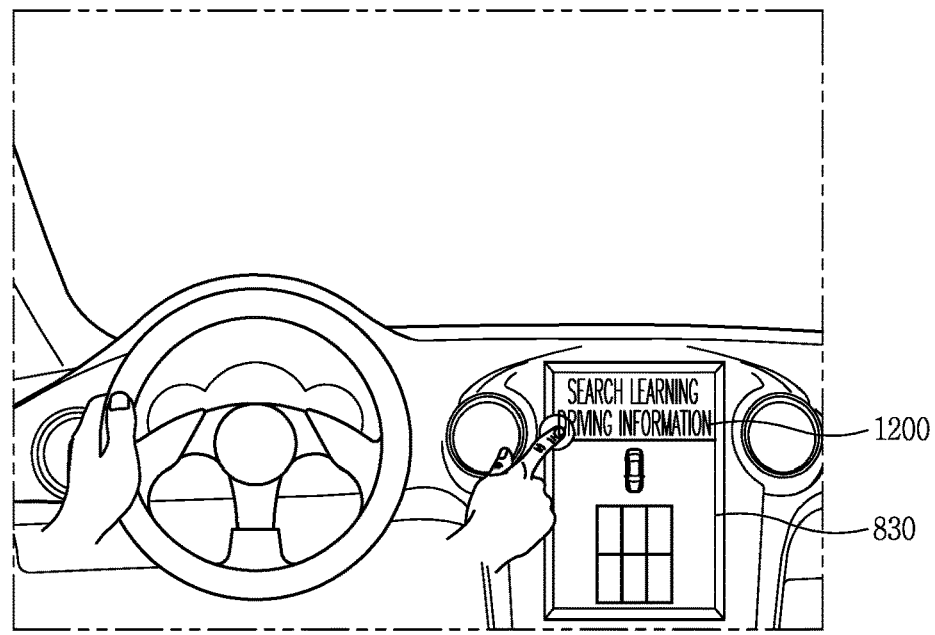
Figure 12:
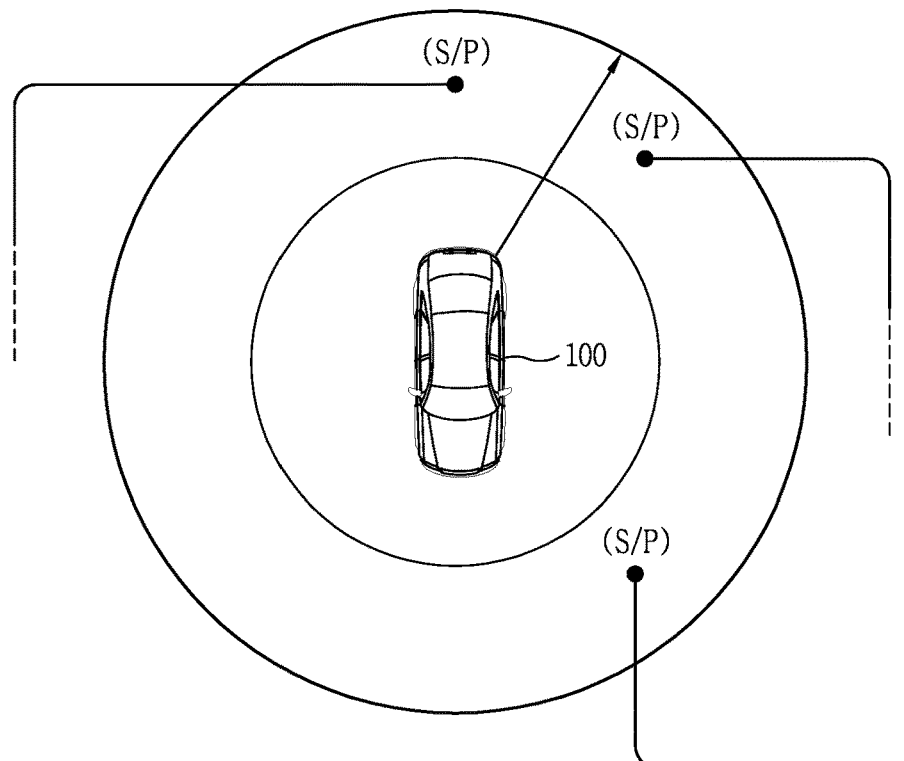

For example, as illustrated in (a) of FIG. 12, the display unit 830 may output a graphic object 1200 (icon, button, image, video, etc.) associated with a function of detecting presence or absence of driving information that the vehicle has traveled in the manual driving mode within a preset distance from a place where the vehicle 100 is currently located.

At this time, when a touch is applied to a graphic object 1200 (when a user request is received), the processor 870, as illustrated in (b) of FIG. 12, may detect (search for) the presence or absence of the driving information that the vehicle has traveled in the manual driving mode with gradually increasing a radius from the place where the vehicle 100 is currently located.

This detection (or search) may be performed in an external device such as the Internet, a cloud, an external server or a mobile terminal or performed in the memory, under the control of the processor 870.

Hereinafter, description will be given of an example in which first driving information 1000*a* and second driving information 1000*b* different from the first driving information 1000*a* exist in the space A in which the driving information traveled in the manual driving mode exists, as illustrated in FIG. 11.

The first driving information 1000*a* and the second driving information 1000*b* may include different start places 1010*a* and 1010*b*, different end places 1020*a* and 1020*b*, and different travel routes.

However, the present invention is not limited to this, and the first and second driving information 1000*a* and 1000*b* may have the same start place or the same end place, or have travel routes in which at least parts are the same as each other.

That is, at least one of the start place and the end place or at least part of each travel route may be the same in the first and second driving information 1000*a* and 1000*b*.

Thereafter, in the present invention, when an end point is selected, a start point associated with the end point (i.e., a start point included in driving information including the end point) is output on the display unit (S920).

Specifically, when any one of end points output on the display unit 830 is selected, the processor 870 may output on the display unit 830 a start point corresponding to a start place where the vehicle should be located to travel autonomously up to an end place corresponding to the selected end point.

Here, it may be understood that the end place and the start place are linked to each other as information included in one driving information.

The display unit 830 may display not only the start point associated with the end point but also travel route information included in the driving information.

Thereafter, in the present invention, when the vehicle is moved up to the start place corresponding to the start point in the manual driving mode, the vehicle may autonomously travel along a travel route from the start place to the end place based on the driving information (that is, the driving information including the start place) (S930).

Specifically, when the vehicle is not located at the start place, the processor 870 may output notification information informing that the vehicle 100 should be moved up to the start place by manual driving.

Thereafter, when the vehicle 100 is moved to the start place by the driver through the manual driving, the processor 870 may autonomously run the vehicle up to the end place on the basis of the driving information that the vehicle has traveled in the manual driving mode.

Hereinafter, more various user interfaces will be described with reference to the accompanying drawings.

As illustrated in (a) of FIG. 13, the processor 870 may output on the display unit 830 a plurality of end points 1022*a* and 1022*b* corresponding to a plurality of end places when the plurality of end places are detected within a predetermined distance from the vehicle 100.

At this time, the display unit 830 may display a graphic object 100*a* indicating a point corresponding to a current position of the vehicle 100. The graphic object 100*a* may be output on the display unit 830 together with the plurality of end points 1022*a* and 1022*b*.

The first end point 1022*a* is a point at which the first end place 1020*a* of FIG. 11 is indicated on the display unit, and the second end point 1022*b* is a point at which the second end place 1020*b* of FIG. 11 is indicated on the display unit.

That is, the first end point 1022*a* corresponds to the first end place 1020*a*, and the second end point 1022*b* corresponds to the second end place 1020*b*.

As illustrated in FIG. 11, the end place, the start place, and the travel route may be associated as one driving information. In other words, it may be understood that the end point, the start point, and the travel route information output on the display unit 830 are also linked to each other.

At this time, when there is driving information within a predetermined distance from a current position of the vehicle 100, the processor 870 may output only an end point corresponding to an end place of the driving information on the display unit 830. This is to prevent a limited output space of the display unit from being congested.

Figure 13A:
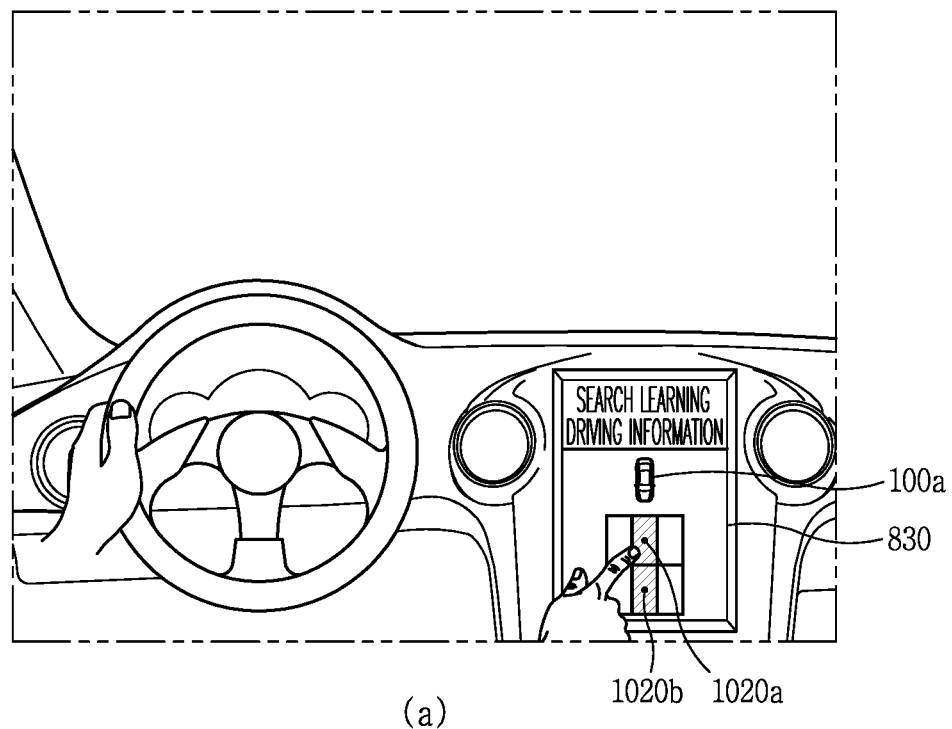
Figure 13A:
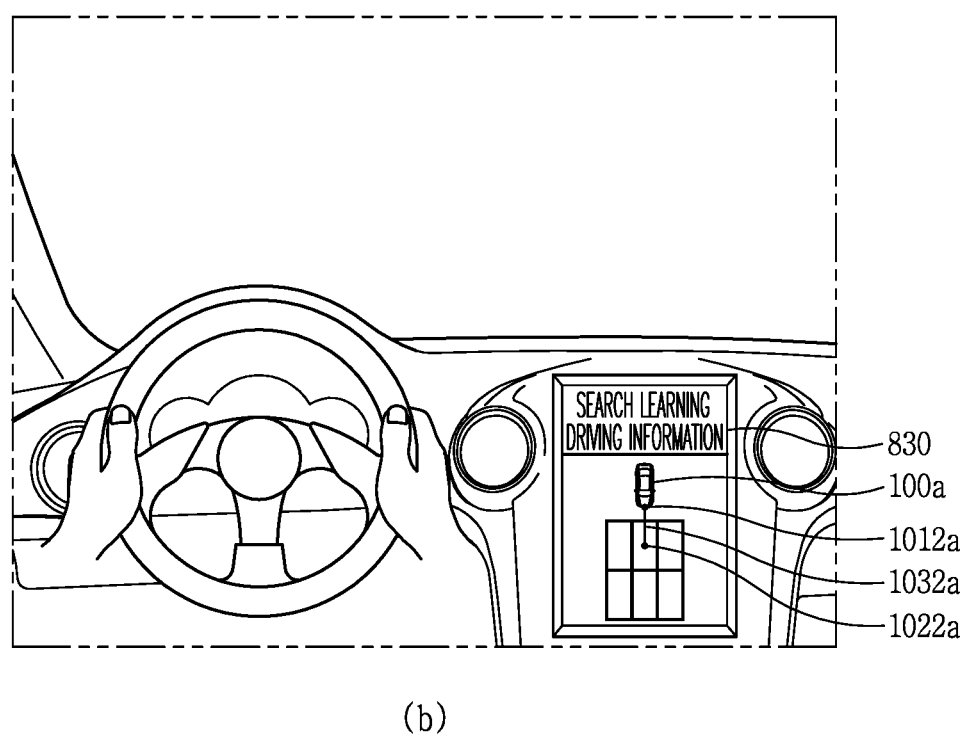

As illustrated in (a) of FIG. 13A, when one end point (for example, 1022a) of the plurality of end points 1022a and 1022b is selected, the processor 870, as illustrated in (b) of FIG. 13A, may output on the display unit 830 a start point 1012a associated with the selected end point 1022a, and a travel route 1032a (or travel route information) from the start point 1012a to the selected end point 1022a.

At this time, as illustrated in (b) of FIG. 13A, when the one of the plurality of end points 1022a and 1022b is selected, the remaining end point 1022b is not displayed on the display unit 830.

That is, the processor 870 may provide a user interface capable of preventing a limited output space of the display unit 830 from being congested and more effectively notifying the driver of a start point for starting autonomous driving, in a manner of not outputting other end points except for the selected end point on the display unit 830.

Thereafter, when the vehicle 100 is moved to the start place 1010a corresponding to the start point 1012a through manual driving, the processor 870 may autonomously run the vehicle 100 up to the end place 1020a using the first driving information 1000a associated with the start place 1010a.

FIG. 13A illustrates that the processor 870 outputs an end point of driving information on the display unit when a preset condition is satisfied, and outputs a start point and a travel route on the display unit when the end point is selected. However, the present invention is not limited to this, and may output driving information on the display unit in various manners.

Figure 13B:
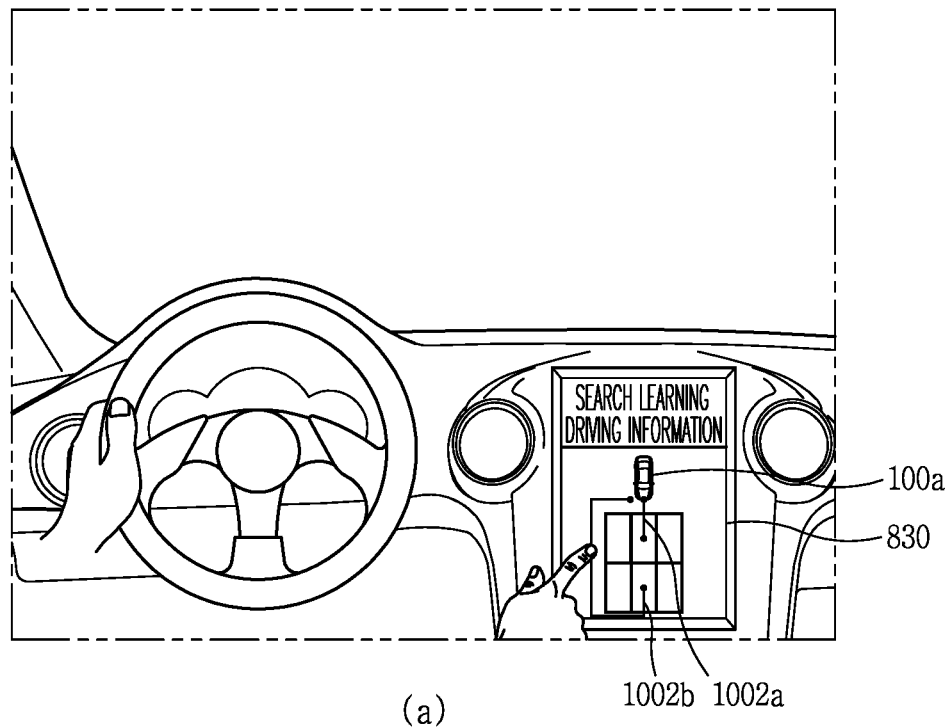
Figure 13B:
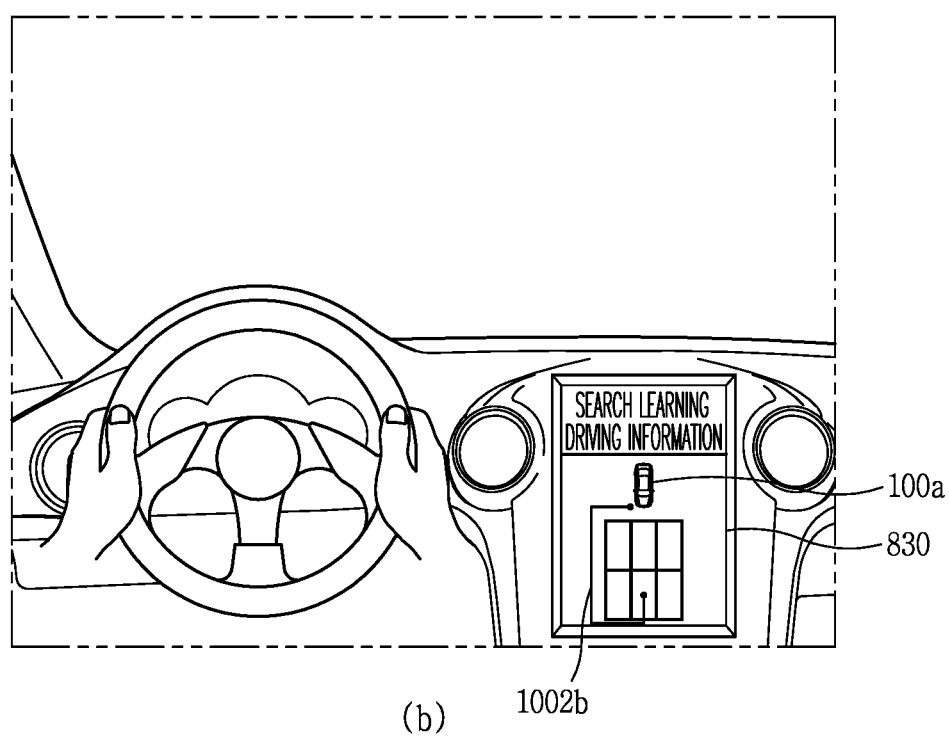

Referring to (a) of FIG. 13B, when a plurality of driving information 1002a and 1002b are detected within a predetermined distance from the vehicle, the processor 870 may output the plurality of driving information 1002a and 1002b on the display unit 830.

Here, the plurality of driving information 1002a and 1002b, as driving information that the vehicle has traveled in the manual driving mode, may be the first driving information 1000a and the second driving information 1000b described in FIG. 11.

The processor 870 may output all of the plurality of driving information on the display unit 830. That is, the processor 870 may output on the display unit 830 a start point corresponding to a start place included in each of the plurality of driving information, a travel route, and an end point corresponding to an end place.

In this state, when one (e.g., 1002b) of the plurality of driving information is selected, the processor 870 may autonomously run the vehicle according to the selected driving information 1002b.

In detail, the processor 870 may autonomously run the vehicle 100 according to the selected driving information 1002b, in response to the vehicle 100 being located at a start place included in the selected driving information 1002b.

Also, as illustrated in FIG. 13B, when the one 1002b of the plurality of driving information is selected, the processor 870 may not output the unselected driving information 1002a on the display unit 830 (that is, the unselected driving information 1002a may disappear from the display unit 830).

On the other hand, the processor 870 may output, on the display unit 830, at least one driving information that the vehicle has traveled in the manual driving mode, in response to a preset condition being satisfied.

As described above, the preset condition may include at least one of entrance of the vehicle 100 into a space where driving information that the vehicle has traveled in the manual driving mode exists, a reception of the driving information through the communication unit, or a reception of a user request.

Figure 13C:
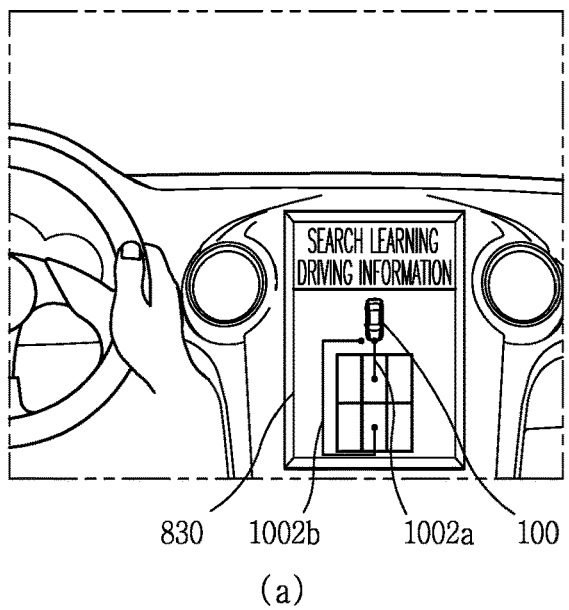
Figure 13C:
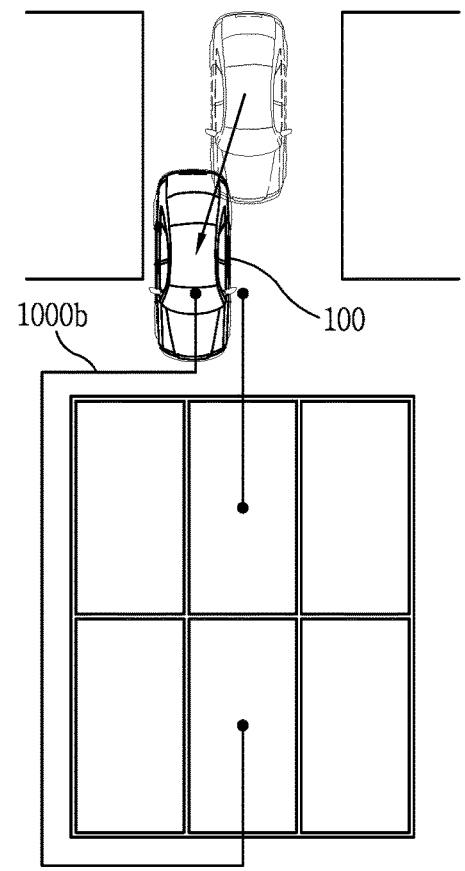
Figure 13C:
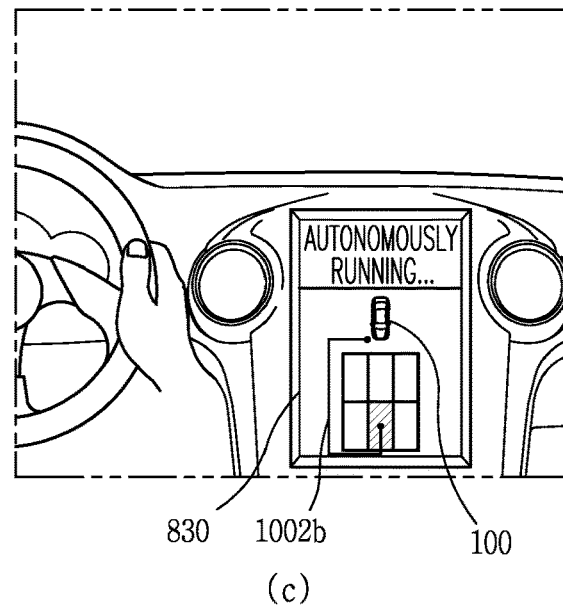

For example, when the preset condition is satisfied (for example, when the vehicle enters the space in which the driving information exists), as illustrated in (a) of FIG. 13C, the processor 870 may output at least one of driving information 1002a, 1002b on the display unit 830.

In this state, as illustrated in (b) of FIG. 13C, when the vehicle 100 is moved to a start place of one of the at least one driving information (for example, when the vehicle is moved to a start point corresponding to a start place of the second driving information 1000b), the processor 870, as illustrated in (c) of FIG. 13C, may not output the other driving information on the display unit 830 (or make the other driving information disappear).

In addition, the processor 870 may autonomously run the vehicle according to the driving information (the second driving information) associated with the one start place.

That is, in the case of FIG. 13C, when the vehicle is moved to one start place of one of the plurality of driving information through manual driving other then the user selecting (touching) the one while the plurality of driving information is output, the processor 870 may automatically run the vehicle using the driving information associated with the one start place.

In addition, when the vehicle is moved to the one start place through the manual driving, the remaining driving information other than the driving information including the one start place may automatically disappear from the display unit 830.

With this configuration, the present invention can provide an optimized user interface, capable of facilitating a selection of driving information that has been learned through manual driving when it is desired to autonomously run the vehicle using the driving information learned through the manual driving.

On the other hand, when the vehicle is manually run to a start place of driving information that the vehicle has traveled in the manual driving mode, in response to a detection of the driving information, the processor 870 may learn a travel route moved up to the start place through the manual driving.

In addition, the processor 870 may change (update, modify) the detected driving information by reflecting driving information that the vehicle has moved to the start place of the driving information in the manual driving mode.

The processor 870 may change driving information including a start place of driving information that the vehicle has traveled in the manual driving mode, by using driving information that the vehicle has traveled manually up to the start place from a place where the vehicle is located at a time point when satisfying a preset condition for outputting an end point (or at least one driving information) corresponding to an end place of driving information.

Here, the preset condition may include at least one of an entrance of the vehicle into a space where driving information that the vehicle has traveled in the manual driving mode exists, a reception of the driving information through the communication unit, or a reception of a user request.

Figure 14:
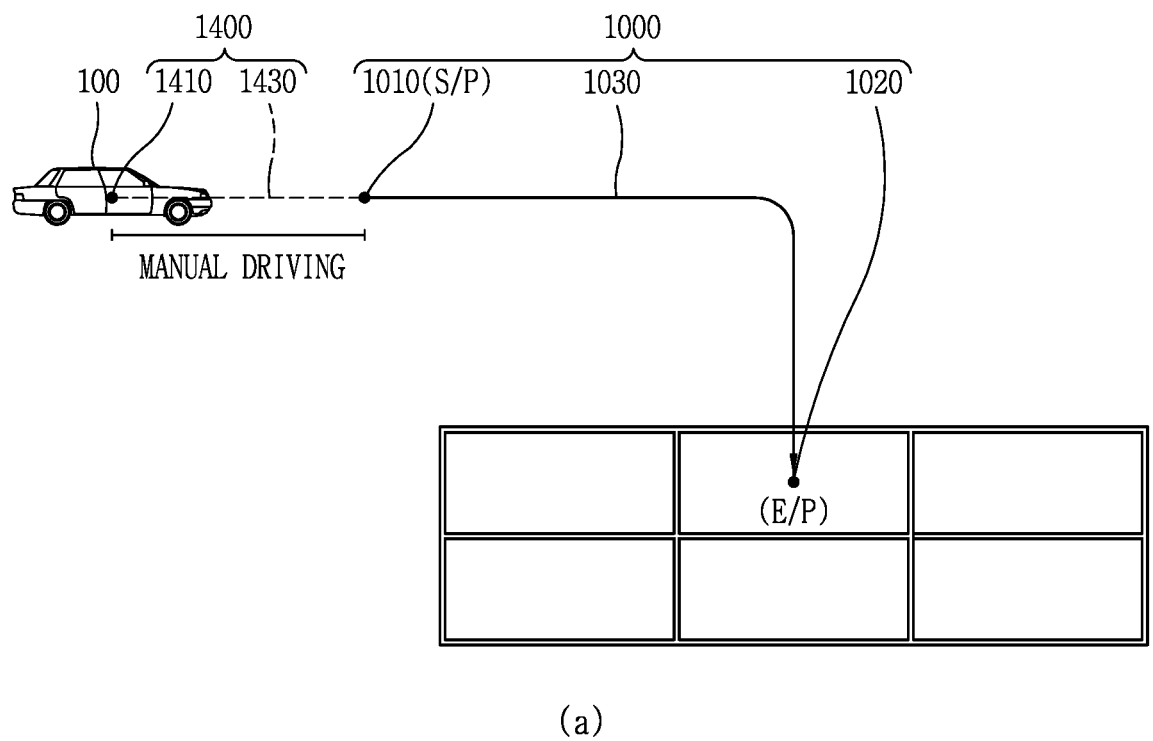
Figure 14:
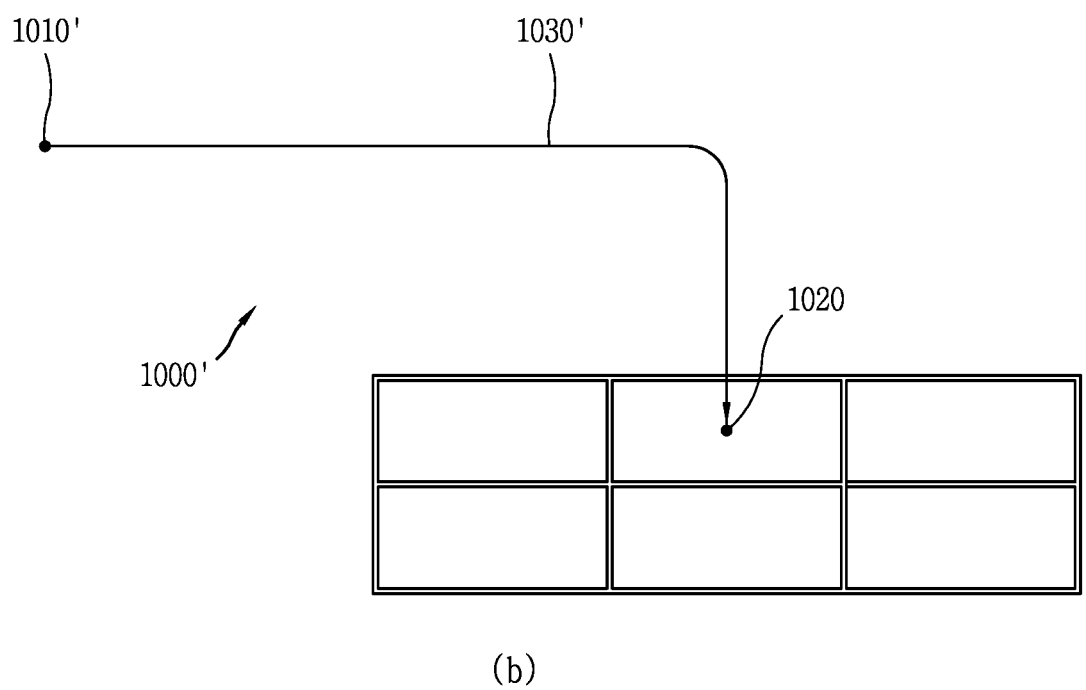

Also, as illustrated in (a) of FIG. 14, the processor 870 may change driving information 1000 including an end place 1020 corresponding to an end point, on the basis of driving information 1400 that the vehicle has traveled in the manual driving mode from a place 1410 where the vehicle is located at a time point of selecting an end point (or a time point of selecting one of a plurality of driving information) up to a start place 1010 corresponding to a start point.

That is, the satisfaction of the preset condition or the selection of the end point (or driving information) may be understood as a control command (or trigger) for learning new driving information.

The start place of the driving information may be changed to a place 1410 of the vehicle (that is, a place where the vehicle exists at a time point that the preset condition is satisfied or the end point (driving information) is selected).

A travel route of the driving information 1000 may further include a travel route 1420 along which the vehicle has traveled in the manual driving mode.

In this case, as illustrated in (b) of FIG. 14, the driving information 1000 including the end place corresponding to the end point may be changed to driving information 1000' including travel route 1030', in which the start place is changed to a place 1010' where the vehicle has been located at a time point that the preset condition is satisfied or the end point (or driving information) has been selected, and to which a travel route 1420 that the vehicle has traveled manually from the place 1010' to the start place 1010 included in the driving information before changed is added (reflected).

Afterwards, when the vehicle 100 reaches the space A again, the processor 870 may autonomously run the vehicle along the changed travel route 1030' from the changed start place 1010' to the end place.

The changed travel route may be stored in the memory in which the driving information that the vehicle has traveled in the manual driving mode can be stored.

With such configuration, the present invention may provide a control method capable of extending a path and distance, in which autonomous driving is allowed, when a vehicle enters the same place repeatedly.

The processor 870 may also receive driving information from at least one of the mobile terminal 1100 or an external device (e.g., a server, a cloud, the Internet or another vehicle) through the communication unit 810.

At this time, the display unit 830 may output thereon screen information for selecting the end place, in response to the preset condition being satisfied.

The processor 870 may output screen information for selecting an end place on the display unit. When the end place is selected, the processor 870 may receive driving information including the end place from at least one of a mobile terminal or an external device through the communication unit 810.

At this time, when a plurality of different driving information including the selected end place is received, the processor 870 may generate new driving information using the plurality of driving information.

At this time, the processor 870 may determine an overlapped travel route among the plurality of different driving information including the selected end place, and generate new driving information to move up to the selected end place by using at least one of the other travel routes except for the overlapped travel route (in this case, a start place may be different).

Here, the driving information received through the communication unit may be driving information learned by manual travel of the vehicle or another vehicle.

In addition, the plurality of driving information may include different end places.

Figure 15:
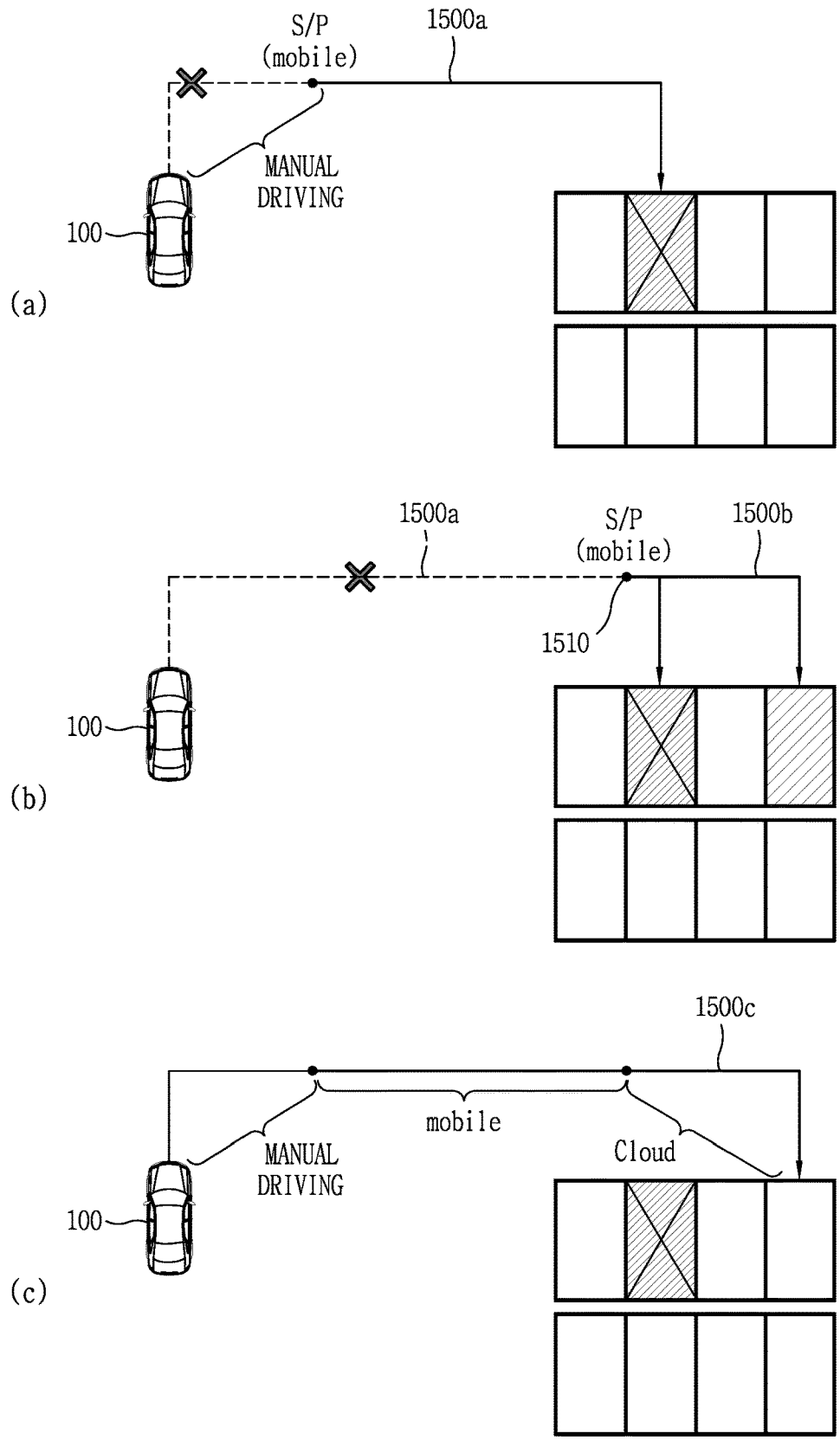

For example, as illustrated in (a) of FIG. 15, first driving information 1500a received from a mobile terminal may include a travel route to travel up to a first end place.

Also, as illustrated in (b) of FIG. 15, second driving information 1500b received from an external device (for example, a cloud server) may include a travel route to travel up to a second end place different from the first end place.

At this time, the first driving information 1500a and the second driving information 1500b may be overlapped by at least parts thereof.

In this case, the processor 870 may generate new driving information to perform autonomous driving up to the second end place, by using a part of the first driving information 1500a and a part of the second driving information 1500b.

The processor 870 may generate new driving information by selecting a front or rear part of the overlapped travel route, if necessary, using at least two driving information including the overlapped travel route of the plurality of different driving information.

In addition, when the vehicle 100 is moved up to a start place of the new driving information, the processor 870 may learn driving information that the vehicle has traveled up to the start place in the manual driving mode.

That is, the processor 870 may change new driving information using driving information that the vehicle has traveled in the manual driving mode from its current position to the start place of the new driving information.

In this case, the start point of the new driving information may be changed to the current position of the vehicle, and a travel route of the new driving information may be added as long as the travel route that the vehicle has traveled in the manual driving mode from the current position to the start place (S/P (mobile)) of the new driving information.

That is, the processor 870 may generate new driving information by using the driving information that the vehicle has traveled up to the start place in the manual driving mode, a part of the first driving information received from the mobile terminal, and a part of the second driving information received from the external device.

In this case, an autonomous travel route to the second end place extends and the start place is changed.

With such a configuration, the present invention can provide a vehicle control method capable of gradually extending a section allowing autonomous driving through learning.

On the other hand, when autonomously driving the vehicle according to driving information that the vehicle has traveled in the manual driving mode, the processor 870 may have a problem that there is an object which was not present when learning the driving information.

As aforementioned, the vehicle control device 800 related to the present invention may include a sensing unit 820 for sensing vehicle-related information. The vehicle-related information may sense an object existing around the vehicle (or within a predetermined distance from the vehicle).

In addition, driving information that the vehicle has traveled in the manual driving mode (or driving information learned through manual driving) may include object information (or an object) that existed when generating the driving information.

The object information may include various object-related information such as a position, a size, a type, a shape, a color, and a movement of the object.

When the vehicle autonomously runs along a travel route from a start place included in the driving information that the vehicle has traveled in the manual driving mode to an end place, the processor 870 may sense through the sensing unit 820 whether or not an object, which is not included in the driving information, is present on the driving path.

Thereafter, when it is sensed through the sensing unit that there is the object which is not included in the driving information, the processor 870 may stop the autonomous driving of the vehicle and output notification information informing the user to switch to the manual driving mode.

In addition, when it is determined through the sensing unit 820 that the object which is not included in the driving information exists on the travel route of the driving information, the processor 870 may also change the travel route of the driving information by using another travel route received through the communication unit or another travel route stored in the memory.

On the other hand, although the learning-based autonomous travel (or the autonomous travel using the driving information that the vehicle has traveled in the manual driving mode) is possible, when the sensing unit 820 is not installed, a case where the object which is not included in the driving information exists on the travel route may be a problem.

Figure 16:
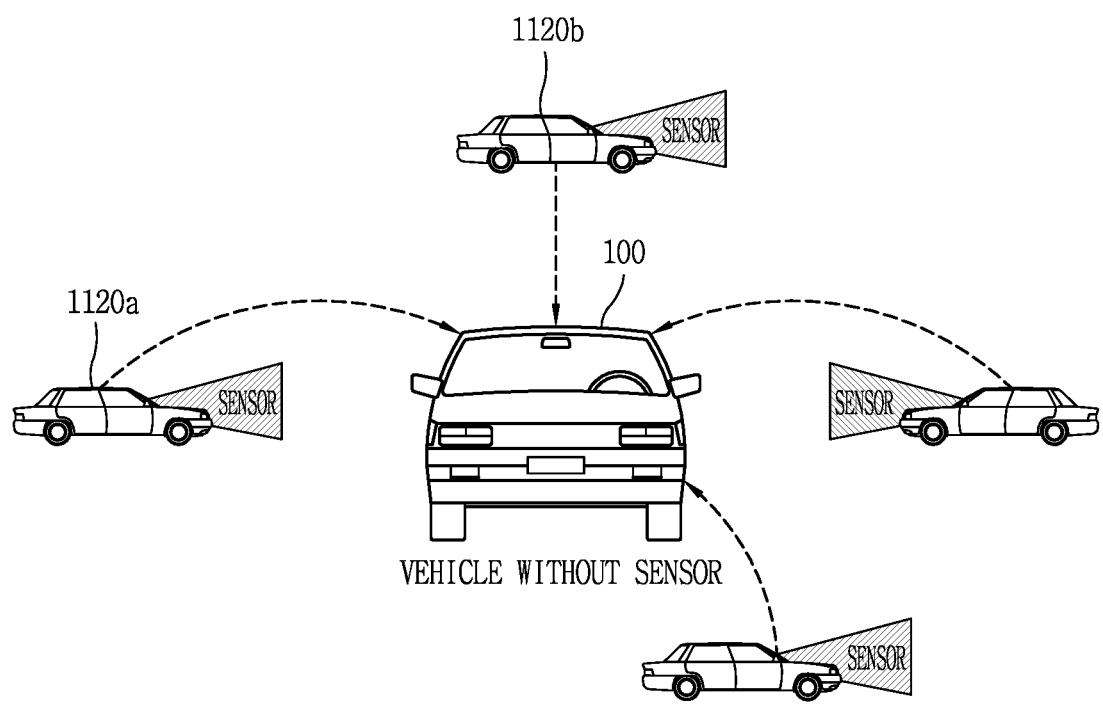

At this time, the processor 870, as illustrated in FIG. 16, may receive information related to the vehicle 100 sensed by other vehicles 1120a and 1120b through the communication unit 810.

In this case, when the vehicle 100 autonomously runs along a travel route from a start place to an end place, the processor 870 may autonomously run the vehicle 100 along the travel route based on the information related to the vehicle 100 received through the communication unit 810.

For example, in case where communication is supported within a predetermined distance from the vehicle 100 and other vehicles 1120a and 1120b which can sense the information related to the vehicle 100 exist, the processor 870 may receive the vehicle-related information from the other vehicles when autonomously driving the vehicle using the driving information that the vehicle has traveled in the manual driving mode.

At this time, the vehicle-related information may include object information existing within a predetermined distance from the vehicle.

The processor 870 may determine whether or not there is an object which is not included in the driving information that the vehicle has traveled in the manual driving mode, by using the vehicle-related information sensed by the other vehicles and received through the communication unit.

Afterwards, when it is determined that there is the object which is not included in the driving information based on the vehicle-related information received through the communication unit 810, the processor 870 may stop the autonomous driving of the vehicle, and output notification information informing the user to switch to the manual driving mode.

In addition, when the object which is not included in the driving information exists on the travel route of the driving information based on the vehicle-related information received through the communication unit 810, the processor 870 may also change the travel route of the driving information by using another travel route received through the communication unit or another travel route stored in the memory.

With this configuration, the present invention can provide a vehicle control device, capable of performing autonomous driving more safely by determining whether an unidentified object exists on a travel route based on information received through the sensing unit or the communication unit even when the vehicle is autonomously driven using the driving information that the vehicle has traveled in the manual driving mode.

Hereinafter, description will be given in more detail of various methods of autonomously driving a vehicle based on learning (learned) driving information, with reference to the accompanying drawings.

FIGS. 17, 18, 19, 20, 21, 22, 23, and 24 are flowcharts and conceptual views illustrating a method of autonomously driving a vehicle using a learning-based autonomous driving mode according to the present invention.

Figure 17:
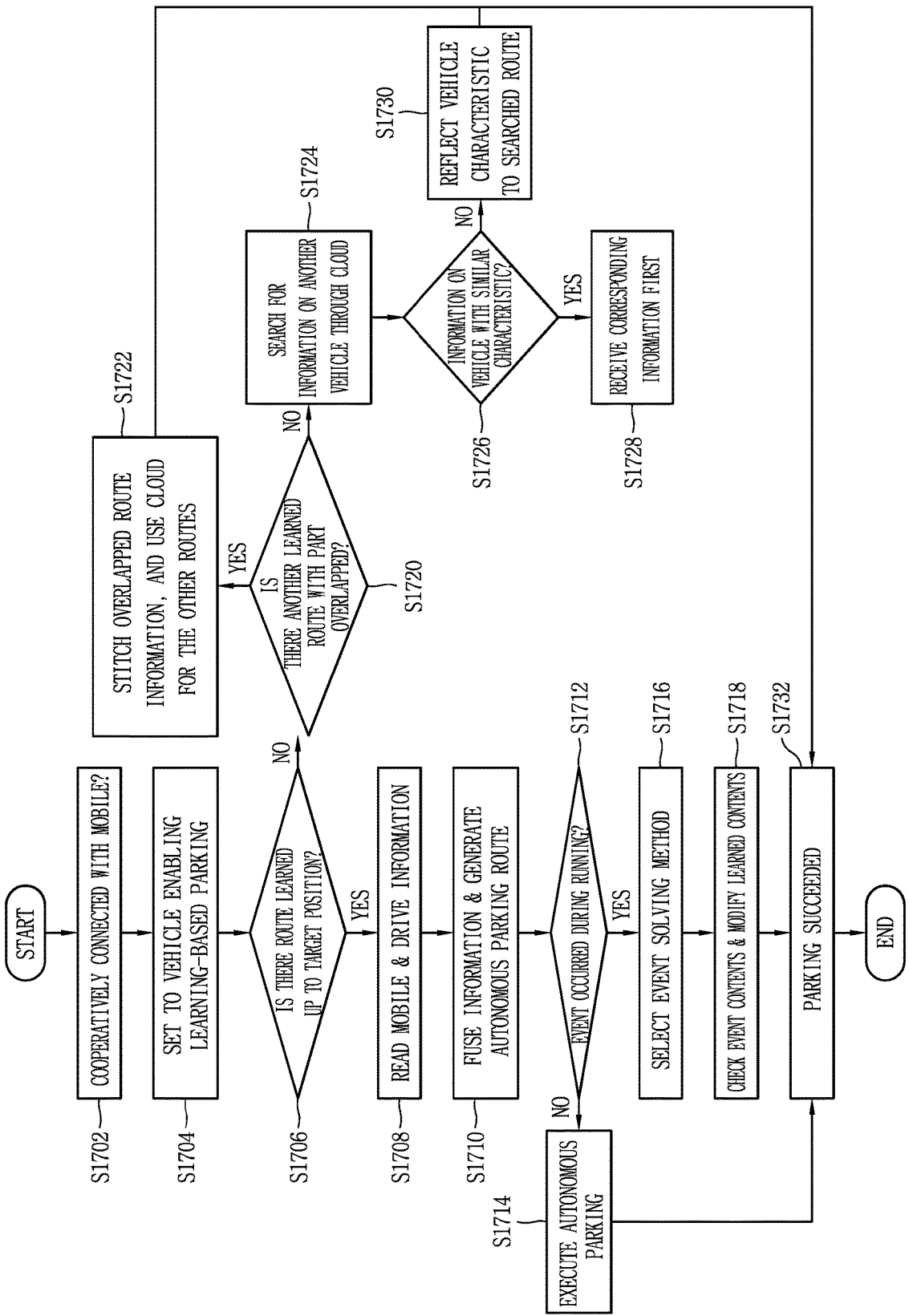
FIGS. 17, 18, 19, 20, 21, 22, 23, and 24 are flowcharts and conceptual views illustrating a method of autonomously running a vehicle using a learning-based autonomous driving mode according to the present invention.

First, referring to FIG. 17, the processor 870 of the present invention may be (cooperatively) connected to a mobile terminal (mobile) through the communication unit 810 to perform communication with the mobile terminal (S1702).

For example, the connection with the mobile terminal may also be performed based on a user request, or performed based on a satisfaction of a preset condition (for example, when there is a history that the connection with the mobile terminal has been established before, when the vehicle is turned on, when the mobile terminal enters the vehicle, or the like).

The mobile terminal of the present invention may autonomously run the vehicle using driving information that the vehicle has traveled in the manual driving mode.

When connected to the mobile terminal, the processor 870 may set the vehicle to a state in which learning parking (i.e., learning-based autonomous driving) is enabled (S1704).

For example, the setting of the vehicle may include receiving from the mobile terminal driving information that the vehicle has traveled in the manual driving mode, entering a standby state in which real-time streaming is allowed, alerting a drive of the vehicle into a state in which autonomous driving is possible based on the driving information that the vehicle has traveled in the manual driving mode, and the like.

Figure 18:
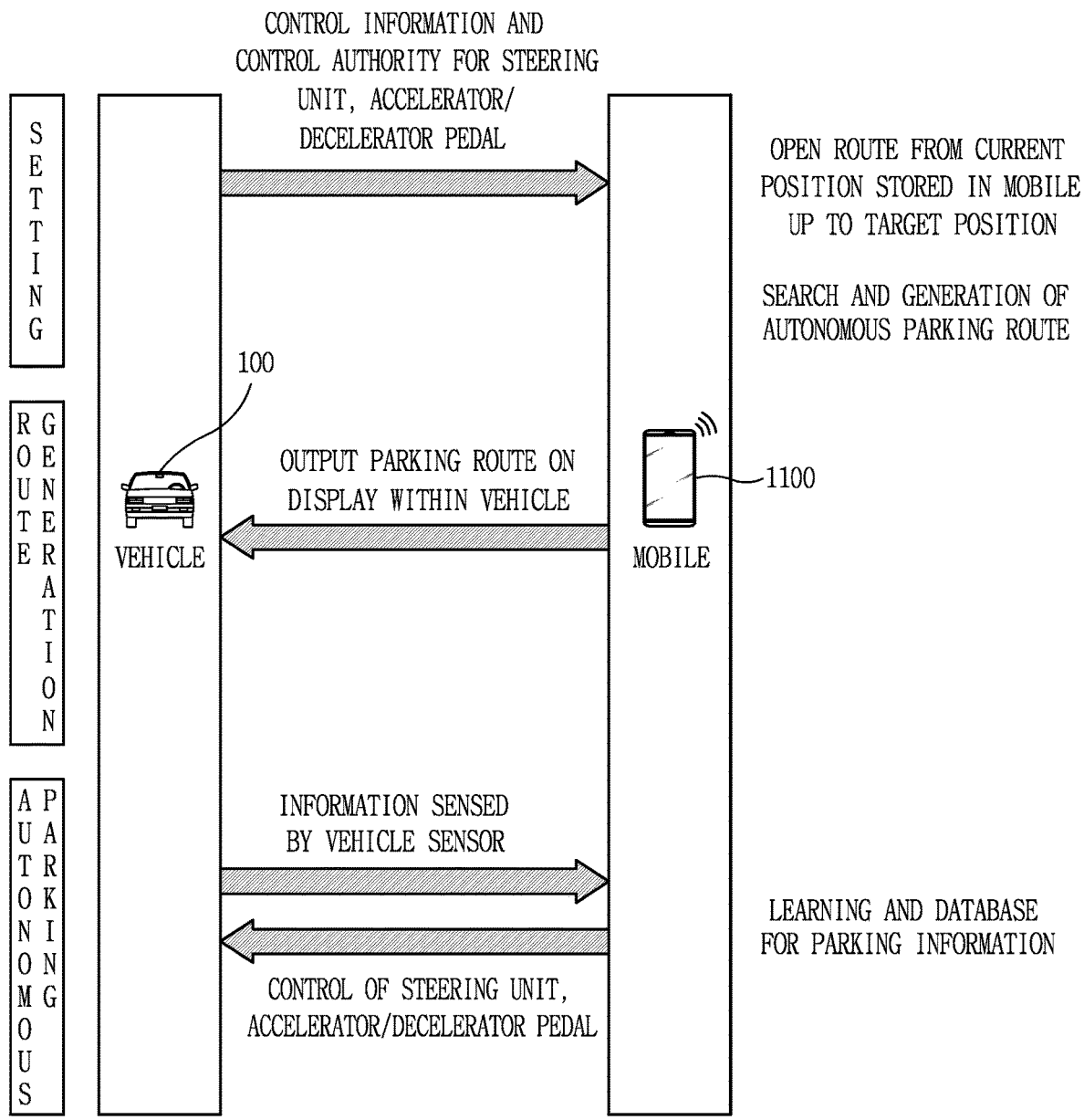

Referring to FIG. 18, the setting of the vehicle may include granting (or transferring) control information and a control authority with respect to a steering unit (the steering wheel) and an accelerator/decelerator pedal unit of the vehicle 100 to Mobile (mobile terminal).

The mobile terminal may receive a travel route (driving information) from a current position (or a current position of the vehicle) to a target position (end place) from a memory of the mobile terminal or an external device.

Thereafter, when the end place (the target position) is selected as described above, the processor 870 may determine whether a learned travel route (driving information) up to the end place (target position) exists (S1706).

Here, when the learned travel route up to the end place (i.e., driving information that the vehicle has traveled to the end place in the manual driving mode) exists, the processor 870 may load the driving information in the mobile terminal or a drive (or the memory) (S1708).

Thereafter, the processor 870 may generate an autonomous parking route (or an autonomous travel route) that the vehicle travels to the end place using the driving information (S1710).

Here, the generated autonomous parking route may be understood as information obtained by correcting (compensating for) the driving information in consideration of the characteristics of the vehicle 100 such as a type, a size, a turning radius, and the like.

Referring to FIG. 18, generating the route may include outputting the driving information (or travel route) received from the mobile terminal 1100 on the display unit 830 within the vehicle (or the vehicle control device).

The processor 870 may autonomously run the vehicle using the generated autonomous parking route (or the driving information). In addition, the processor 870 may sense vehicle-related information during the autonomous driving using the sensing unit 820.

In detail, the processor 870 may sense through the sensing unit 820 whether an unidentified object exists (or whether an event occurs) on the travel route included in the driving information during the autonomous driving (S1712).

Referring to FIG. 18, the processor 870 may transmit vehicle-related information sensed through the sensing unit 820 to the mobile terminal 1100.

The mobile terminal 1100 may autonomously run the vehicle by controlling a steering unit and an accelerator/decelerator pedal unit of the vehicle 100, based on the vehicle-related information received from the processor 870.

If no event is generated during the autonomous driving, the processor 870 may perform autonomous driving (autonomous parking) of the vehicle using the autonomous parking route (or driving information) (S1714).

On the other hand, when an event occurs during the autonomous driving, the processor 870 may select one of a plurality of methods of responding to the generated event (S1716).

For example, the methods of responding to the event may include a method of stopping the autonomous driving of the vehicle, a method of autonomously running the vehicle using another driving information that the vehicle has traveled up to the end place when the another driving information exists, a method of detecting driving information that the vehicle has traveled in the manual driving mode up to a predetermined distance from the end place and autonomously running the vehicle using the detected driving information, and the like.

That is, the processor 870 may change the driving information used for the autonomous travel or modify the autonomous travel route when an event occurs while autonomously running the vehicle using the selected driving information.

Thereafter, the processor 870 may check contents of the event and modify the learned contents (S1718). Here, checking the contents of the event may include checking whether the unidentified object is an avoidable object, a movable object, or a communication-allowable object.

Modifying the learned contents may include modifying at least a part (for example, the travel route) of the learned driving information, selecting another driving information to be used for the autonomous travel, and the like.

Specifically, the processor 870 may control the vehicle in a preset manner upon an occurrence of an event that did not exist in the driving information learned in the past (that is, the driving information that the vehicle has traveled in the manual driving mode).

Here, the event may include an occurrence of an accident on the travel route included in the driving information, a presence of an obstacle, a change in road information from that when it was learned (i.e., when the vehicle traveled in the manual driving mode), and the like.

In this case, the processor 870 may provide a notification to the driver.

Specifically, the processor 870 may output information informing a type of an event sensed through the sensing unit 820 on the display unit 830.

The processor 870 may also output on the display unit 830 a selection window for selecting whether to switch to the manual driving mode or search for (or detect) a new route.

When receiving a selection to switch to the manual driving mode, the processor 870 may control the vehicle through the driver's manual driving.

In addition, the processor 870 may learn the driver's manual driving, so as to generate new driving information and store the generated driving information in a memory.

As another method, the processor 870 may detect or search for whether or not to generate driving information to avoid the event among travel routes (learned routes) of the mobile terminal and/or a cloud server when a user request for detecting a new route is received.

Figure 19:
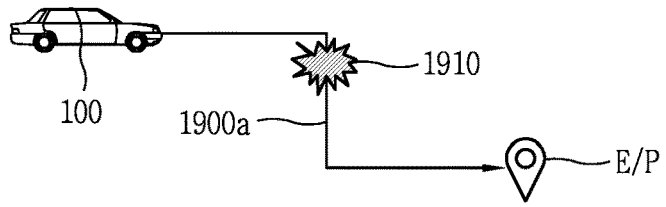
Figure 19:
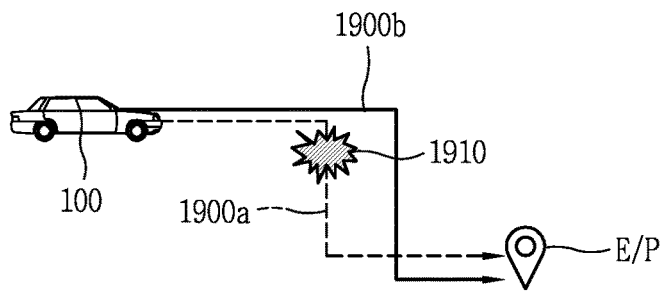
Figure 19:
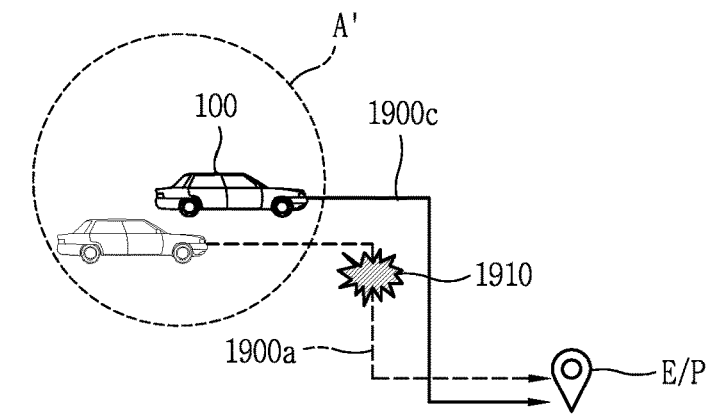
Figure 19:
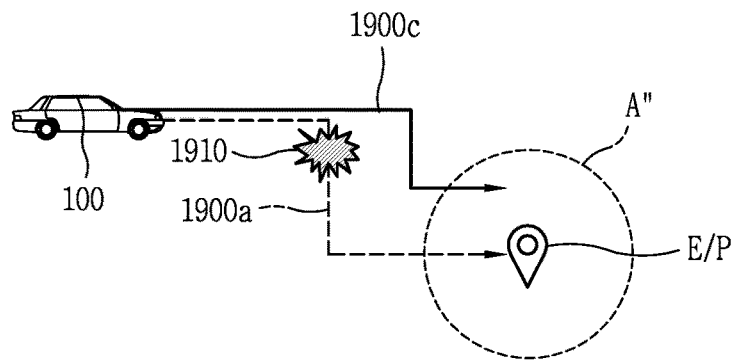

For example, as illustrated in (a) of FIG. 19, when an end place E/P is set, the processor 870 may search for a travel route 1900a to travel up to the end place E/P.

Thereafter, when an occurrence of an event 1910 on the travel route 1900a is detected through the sensing unit 820, as illustrated in (b) of FIG. 19, the processor 870 may search for in the mobile terminal or the cloud server a new travel route 1900b to avoid the event 1910, a new travel route 1900c in which a start place is present within a predetermined distance A' from the vehicle and the event can be avoided, or a new travel route 1900d in which a place within a predetermined distance A" from the selected end place is an end place and the event can be avoided.

The processor 870 may autonomously run the vehicle by avoiding the event based on the new driving information searched in the mobile terminal or the cloud server.

In addition, the processor 870 may store the detected new driving information in the memory.

Hereinafter, description will be given in more detail of UI/UX for performing learning-based autonomous driving, with reference to the accompanying drawings.

Figure 20:
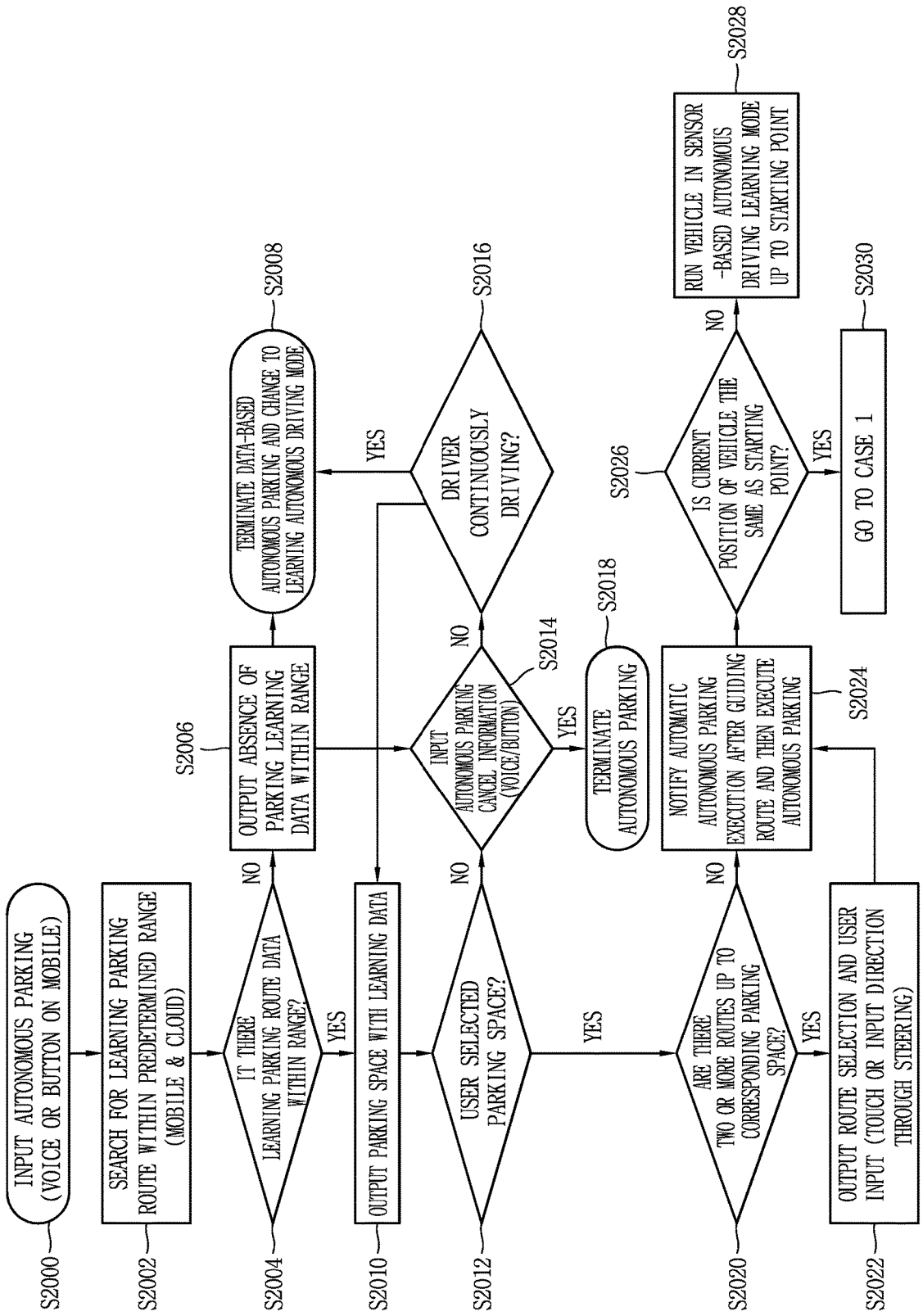

First, referring to FIG. 20, in the present invention, the processor 870 receives a user input (or an autonomous driving trigger) for starting autonomous driving (autonomous parking) (S2000).

Figure 21:
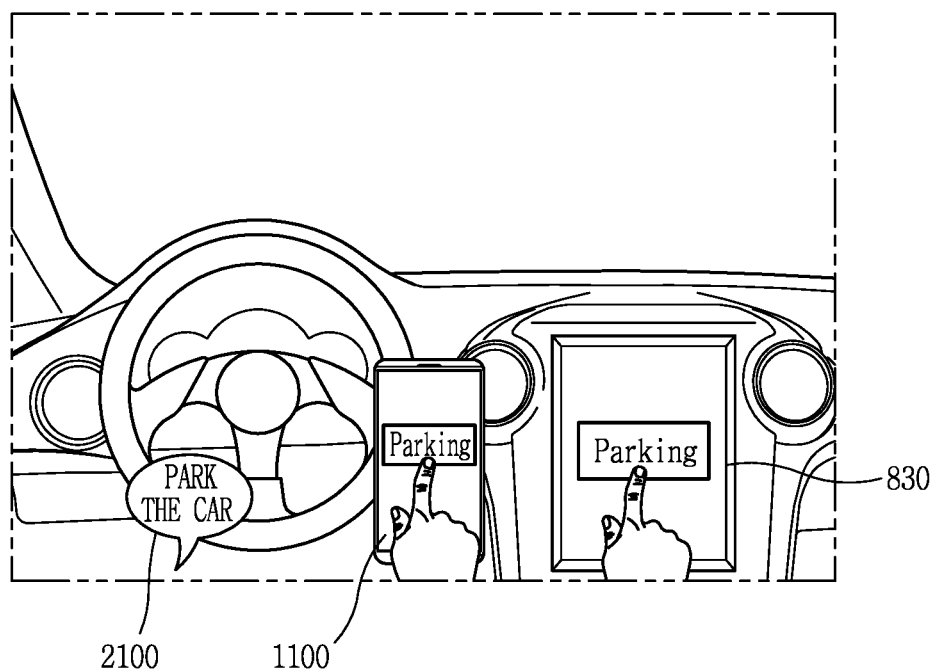

For example, the processor 870, as illustrated in FIG. 21, may receive a preset command voice, receive the user input through the display unit 830, or receive the user input through the mobile terminal which is connected to perform communication.

Thereafter, the processor 870 may detect, based on the user input, an existence or absence of driving information that the vehicle has traveled in the manual driving mode (or learned parking route) within a predetermined range from the vehicle 100 (S2002).

At this time, the processor 870 may search for the driving information in the memory of the vehicle control device, the mobile terminal, or the external device (for example, the cloud server).

Thereafter, the processor 870 may determine presence or absence of the driving information within the predetermined range (S2004).

Figure 22:
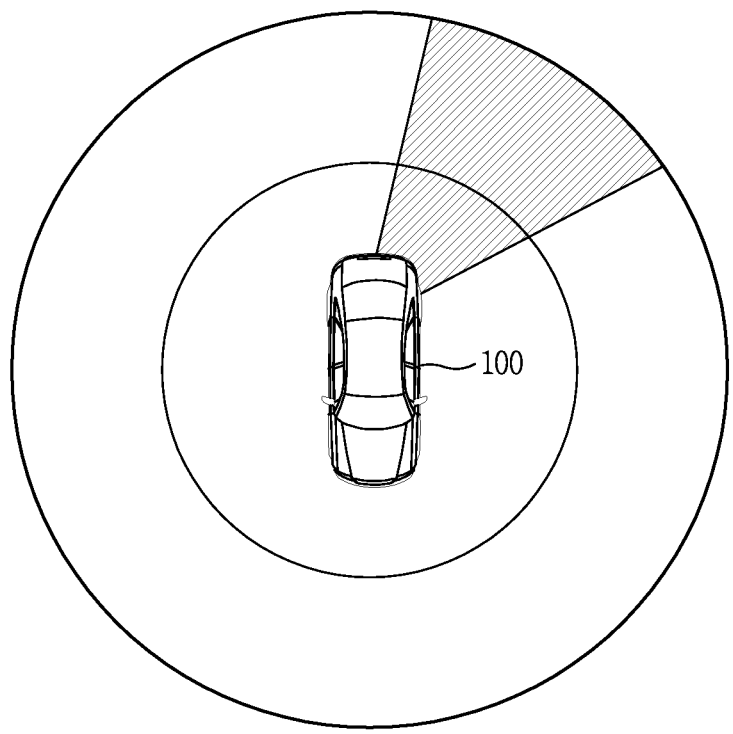
Figure 22:
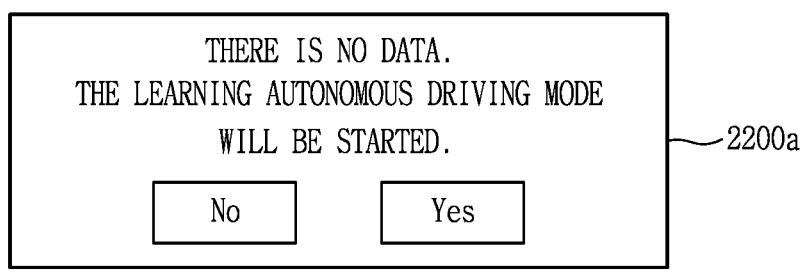

At this time, the processor 870, as illustrated in (a) of FIG. 22, may search for the driving information in a manner of getting farther away from a current position of the vehicle 100.

At this time, the processor 870 may differently set a search range depending on a place (for example, the end place) to park the vehicle (or according to the current position of the vehicle).

For example, when the place to park the vehicle is a building, the processor 870 may search for driving information based on an available parking space of a ground/underground parking lot.

As another example, the processor 870 may search for a parking space and driving information with respect to the entire parking lot when the place to park the vehicle is a flat parking lot.

As another example, when the place to park the vehicle is road parking, the processor 870 may search for driving information and a parking space by extending a radius from a current position of the vehicle (for example, 1 km→3 km→5 km).

The processor 870 may extend a parking range to the road parking when there is no empty space in the building or in the parking lot.

In addition, the processor 870 may set the highest priority to driving information with respect to a currently-empty parking space. When there is another vehicle which is standing by to leave the parking lot, the processor 870 may include even driving information including a position of the another vehicle as a target to search for.

Further, the processor 870 may select one of a plurality of driving information by comparing a current position of the vehicle with a position of a start place and a position of an end place of driving information.

In addition, the search for the driving information may be performed in all of the memory, the mobile terminal and the external device (the cloud server).

For example, the processor 870 may set a first priority for driving information stored in the memory, a second priority for driving information stored in the mobile terminal, and a third priority for driving information included in an external device. These priorities may be determined or changed based on a user setting or characteristics of the vehicle and characteristics of another vehicle included in detected driving information.

When driving information is not present within a predetermined range, the processor 870 may output notification information 2200a ((b) of FIG. 22) indicating the absence of the driving information on the display unit 830 (S2006).

In this case, the notification information 2200a may be a selection window for selecting whether or not to perform learning.

The processor 870 may terminate data-based autonomous parking when driving information is not present within the predetermined range. In other words, the processor 870 may terminate a mode for autonomously running the vehicle based on driving information that the vehicle has traveled in the manual driving mode.

Thereafter, the processor 870 may change the driving mode to a learning-based autonomous driving mode for learning (storing, generating) driving information that the vehicle is to be driven manually by the driver later (S2008).

The processor 870 may generate (learn) driving information that the vehicle 100 travels in the manual driving mode, and store the generated driving information in the memory.

On the other hand, when driving information (learning data) exists within a predetermined range, the processor 870 may output a parking space with the driving information on the display unit 830.

At this time, the processor 870 may output the parking space having the driving information on the display unit 830 in various ways.

Figure 23:
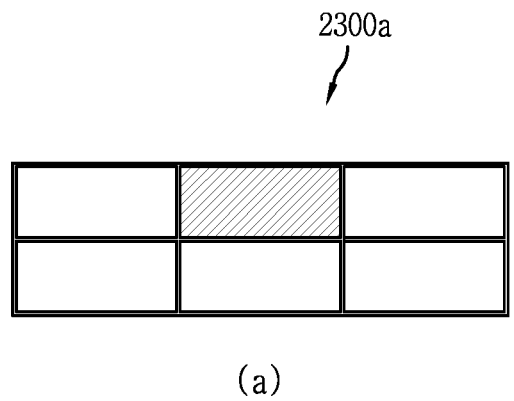
Figure 23:
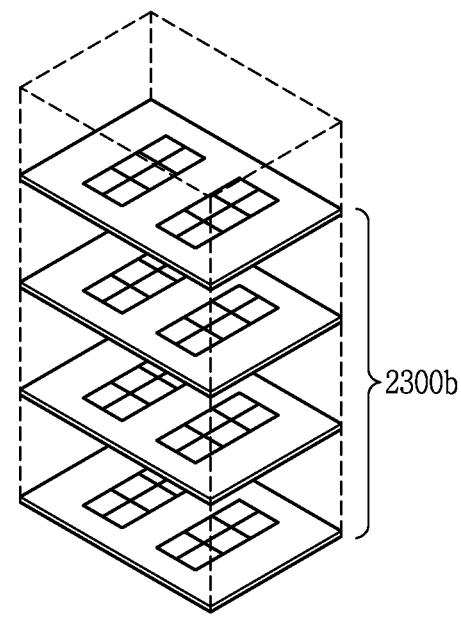
Figure 23:
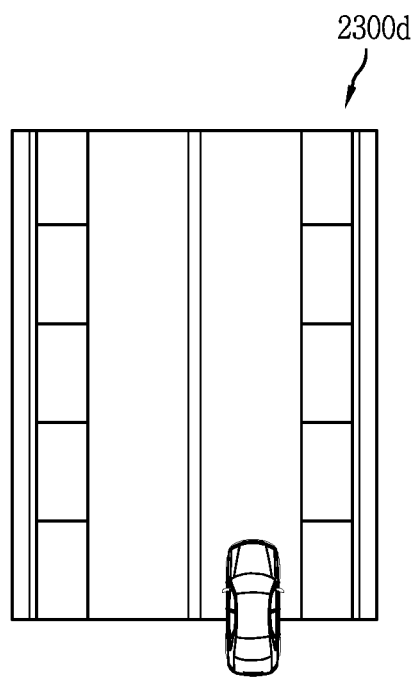
Figure 23:
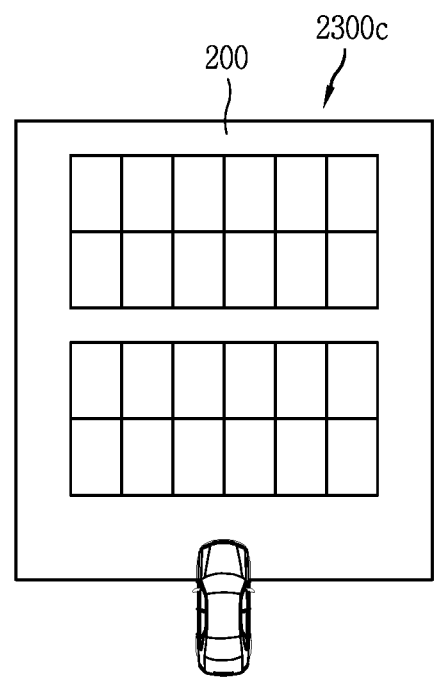

For example, as illustrated in (a) of FIG. 23, the processor 870 may output information 2300a related to a parking space (for example, a position of the parking space, characteristics of the parking space, and the like) on the display unit 830.

The processor 870 may also output only filtered parking spaces of a plurality of parking spaces on the display unit 830.

For example, the processor 870 may output on the display unit a parking space, which satisfies a preset condition (filtering condition) (for example, a side of a pillar, a side of a wall, a wide one of parking spaces, etc.), or output on the display unit a parking space having driving information, which is located at a place close to a current position of the vehicle, among parking spaces.

In addition, the processor 870 may perform V2X communication through the communication unit 810 to receive an image from a camera provided in a vehicle located at an opposite side to a space to park or a camera (CCTV) of a building (parking lot), and output the received image on the display unit.

Even for the parking space having the driving information, when an unidentified object exists on a travel route from a start place to the corresponding parking space (end place), the processor 870 may also output warning information on the display unit.

In addition, the processor 870 may output a parking space in various ways according to a space desired to park the vehicle (or a current position of the vehicle).

For example, as illustrated in (b) of FIG. 23, the processor 870 may output on the display unit 830 the parking space in a first shape 2300b when the space desired to park the vehicle is within a building.

As another example, as illustrated in (c) of FIG. 23, the processor 870 may output on the display unit 830 the parking space in a second shape 2300c when the space desired to park the vehicle is an external parking lot.

As another example, as illustrated in (d) of FIG. 23, the processor 870 may output on the display unit 830 the parking space in a third shape 2300d when the space desired to park the vehicle is road parking.

Thereafter, the processor 870 may allow the user to select the parking space through the display unit 830 (S2012).

When the parking space having the driving information that the vehicle has traveled in the manual driving mode has been searched but a user input for selecting the parking space is not received, the processor 870 may determine whether or not there is a user input to cancel autonomous driving.

When the driver continuously drives the vehicle in a non-received state of the user input to cancel the autonomous driving (S2016), the processor 870 may generate driving information that the vehicle has traveled in the manual driving mode and the store the generated driving information in the memory (S2008).

At this time, for example, the generated driving information may be configured in a manner that a position of the vehicle at the time point when a user input for performing autonomous parking is received or a position of the vehicle at the time point when the search is completed is set to a start place, and a point where the vehicle is turned off is set to an end place. In addition, a path from the start place to the end place may be set to a travel route of the driving information.

On the other hand, the processor 870 may terminate the autonomous parking when a user input to cancel the autonomous driving is received (S2018). Thereafter, the processor 870 may drive the vehicle according to a user's manual driving after entering the manual driving mode.

On the other hand, when the parking space is selected in step S2012, the processor 870 may determine whether there are two or more routes (driving information) moving up to the parking space (S2020).

Here, a selectable parking space may be a parking space with the driving information in which an end place is set to the corresponding parking space.

When there is a plurality of driving information that the vehicle can travel autonomously up to the selected parking space, the processor 870 may output the plurality of driving information on the display unit so that the driving information can be selected (S2022). That is, the processor 870 may output a plurality of selectable routes on the display unit, and select any one route through a user input.

When there is one driving information that the vehicle can autonomously run up to the parking space or when the one driving information (the one travel route) is selected, the processor 870 may output the route included in the driving information on the display unit 830, and autonomously run the vehicle (S2024).

At this time, the processor 870 may determine whether the start place of the driving information is the same as the current position of the vehicle (S2026).

At this time, when the current position of the vehicle is not the same as the start place of the driving information, the processor 870 may output notification information informing that the vehicle should manually run up to the start place through manual driving.

In addition, the processor 870 may learn driving information that the vehicle has manually traveled from the current position of the vehicle to the start place, and update the driving information (S2028).

On the other hand, when the current position of the vehicle is the same as the start place of the driving information, or when the vehicle has moved up to the start place through the manual driving, the flow may proceed to step S1712 of FIG. 17.

Figure 24:
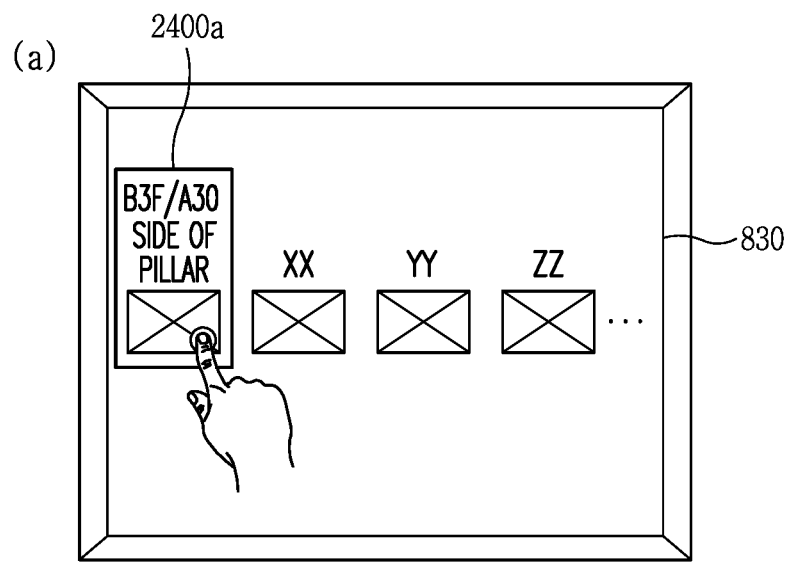
Figure 24:
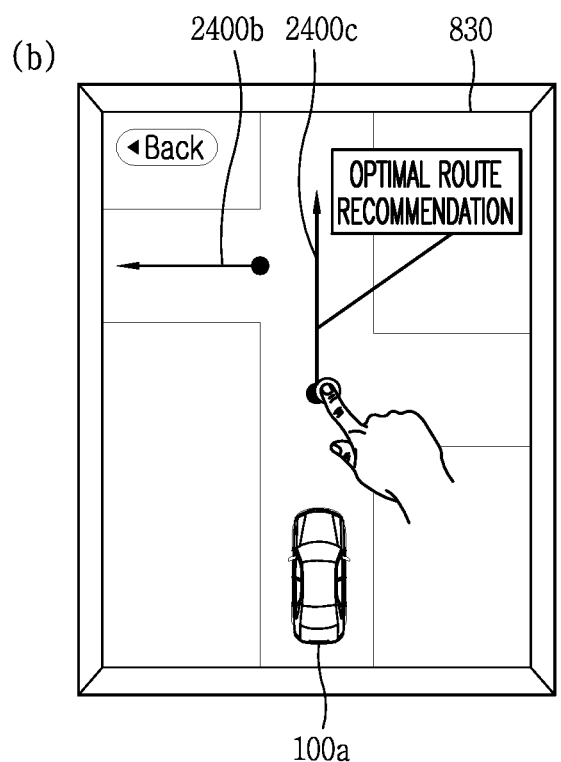
Figure 24:
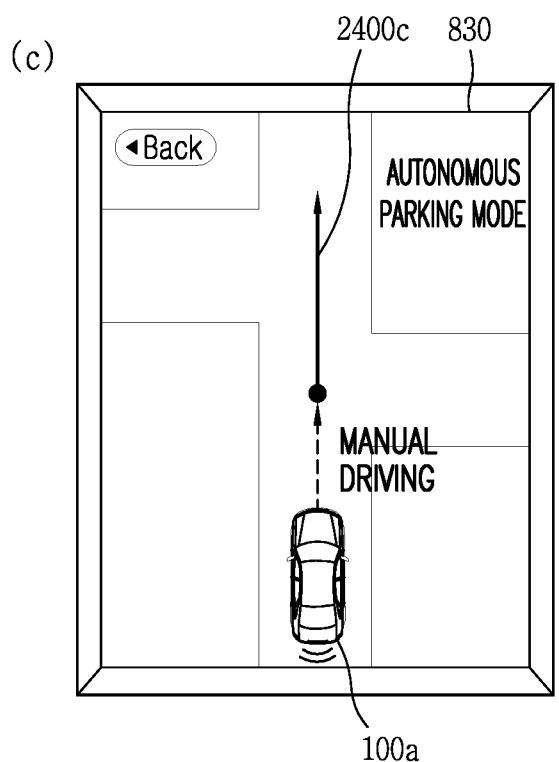

For example, as illustrated in (a) of FIG. 24, when one 2400a of parking spaces including driving information that the vehicle has traveled in the manual driving mode is selected, the processor 870 may determine whether there is a plurality of driving information in which the parking space is set to an end place.

Thereafter, when the driving information is in plurality, the processor 870, as illustrated in (b) of FIG. 24, may output a plurality of driving information 2400b and 2400c on the display unit 830, such that one of the plurality of driving information can be selected.

Here, when one driving information 2400c is selected, the processor 870 may determine whether the vehicle is currently located at a start place of the driving information 2400c.

Thereafter, when the vehicle is not currently located at the start place of the driving information 2400c (that is, when the current position of the vehicle is different from the start place), the processor 870, as illustrated in (c) of FIG. 24, may output on the display unit 830 notification information informing that the vehicle should travel up to the start place by manual driving.

According to an embodiment of the present invention, one or more of the following effects can be provided.

First, the present invention can provide a new autonomous driving method capable of autonomously running a vehicle based on driving-related information learned through manual driving.

Second, the present invention can provide a vehicle control device, capable of autonomously running a vehicle in at least one of a learning-based autonomous driving mode learned through manual driving and a sensor-based autonomous driving mode using a sensing unit, and a method of controlling the vehicle.

Third, the present invention can provide a new method of controlling a vehicle, capable of autonomously running the vehicle in a section, in which the vehicle cannot travel in a sensor-based autonomous driving mode, in a learning-based autonomous driving mode.

Fourth, the present invention can provide a vehicle control method, capable of autonomously running the vehicle even along a travel route on which the vehicle has not traveled in a manual driving mode, by way of generating new driving information using a plurality of learned driving information.

Fifth, the present invention can provide a vehicle control method, capable of autonomously running the vehicle along a travel route of driving information, using information related to the vehicle received from another vehicle through a communication unit even if a sensing unit is not provided.

Sixth, the present invention can provide an optimized user interface for allowing a driver to drive the vehicle in a learning-based autonomous driving mode.

The effects of the present invention are not limited to those effects mentioned above, and other effects not mentioned may be clearly understood by those skilled in the art from the description of the appended claims.

The vehicle control device 800 described above may be included in the vehicle 100.

The operation or control method of the vehicle control device 800 described above may be applied to an operation or control method of the vehicle 100 (or the control unit 170) in the same/like manner.

For example, a method of controlling the vehicle 100 (or a method of controlling the vehicle control device 800) may include autonomously running the vehicle using driving information that the vehicle has traveled in a manual driving mode. The driving information may include a start place where the manual driving mode is started, an end place where the manual driving mode is ended, and a travel route from the start place to the end place. The autonomously running may be configured in a manner of autonomously running the vehicle along the travel route from the start place to the end place when the vehicle has moved up to the start place through manual driving.

Further, the method of controlling the vehicle 100 (or the method of controlling the vehicle control device 800) may further include outputting an end point corresponding to the end place on the display unit, and outputting a start point associated with the end point on the display unit when the end point is selected.

The autonomously running may be configured in a manner of autonomously running the vehicle along the travel route from the start place to the end place based on the driving information when the vehicle has moved up to the start place corresponding to the start point through manual driving.

The outputting the end point on the display unit may be configured in a manner of outputting at least one end point on the display unit based on at least one of an entrance of the vehicle into a space where driving information that the vehicle has traveled in the manual driving mode exists, a reception of the driving information through a communication unit, or a reception of a user request.

More detailed embodiments will be replaced with the aforementioned description or applied in the same/like manner.

Each of the steps may be performed not only by the vehicle control device 800 but also by the controller 170 provided in the vehicle 100.

Further, all functions, configurations, or control methods performed by the vehicle control device 800 described above may be performed by the controller 170 provided in the vehicle 100. That is, all of the control methods described in this specification may be applied to a control method of a vehicle or a control method of a control device.

Further, the vehicle control device 800 described above may be a mobile terminal. Further, all functions, configurations, or control methods performed by the vehicle control device 800 described above may be performed by a controller provided in the mobile terminal. In addition, all the control methods described in this specification can be applied to a method of controlling a mobile terminal in the same/like manner.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device, comprising:
   at least one processor;
   a communicator operably connected to the at least one processor and configured to communicate with at least one of a mobile terminal or an external device; and
   a computer-readable medium coupled to the at least one processor having stored thereon instructions which, when executed by the at least one processor, cause the at least one processor to perform operations comprising:
   determining to autonomously drive a vehicle to a destination,
   based on the determination to autonomously drive the vehicle to the destination, identifying driving information of the vehicle that has traveled to the destination in a manual driving mode,
   wherein the driving information of the vehicle includes:
      a start region from which the vehicle started traveling to the destination in the manual driving mode,
      an end region at which the vehicle finished traveling to the destination in the manual driving mode, and
      a travel route from the start region to the end region,
   wherein the operations further comprise:
      determining that the vehicle is outside of the start region and needs to enter the start region in the manual driving mode to begin autonomously driving to the destination,
      determining that the vehicle has entered the start region in the manual driving mode,
      based on the determination that the vehicle has entered the start region in the manual driving mode, switching to an autonomous driving mode and autonomously driving the vehicle along the travel route from the start region to the end region,
      outputting, on a display provided at the vehicle control device, screen information for selecting a first end region,
      based on a selection of the first end region, receiving first driving information including the first end region from at least one of the mobile terminal or the external device through the communicator, the first driving information comprising information learned by manual travel of another vehicle, wherein receiving the first driving information comprises receiving a plurality of first driving information including the first end region from at least one of the mobile terminal or the external device through the communicator, and
      generating new driving information to drive the vehicle to the selected first end region based on the plurality of first driving information received from at least one of the mobile terminal or the external device through the communicator.

2. The device of claim 1,
   wherein the operations further comprise:
      outputting at least one end point within the end region on the display,
      receiving a selection of an end point from the at least one end point within the end region,
      based on the selection of the end point, outputting a start point associated with the end point on the display,
      determining that the vehicle has entered the start region including the start point in the manual driving mode, and
      based on the determination that the vehicle has entered the start region including the start point in the manual driving mode, switching to the autonomous driving mode and autonomously driving the vehicle along the travel route from the start region to the end region.

3. The device of claim 2, wherein the operations further comprise outputting the at least one end point on the display based on a condition being satisfied.

4. The device of claim 3, wherein the condition comprises at least one of an entrance of the vehicle into a place corresponding to the driving information of the vehicle, a reception of the first driving information through the communicator, or a reception of a user request.

5. The device of claim 2, wherein the operations further comprise:
   based on a finding of a plurality of end regions located within a distance from the vehicle, outputting, on the display, a plurality of end points within the plurality of end regions; and
   based on a selection of one end point among the plurality of end points, outputting, on the display, a start point associated with the selected one end point and a route from the start point to the selected one end point.

6. The device of claim 5, wherein the operations further comprise:
   based on the selection of one end point among the plurality of end points, removing output of unselected end points among the plurality of end points.

7. The device of claim 2, wherein the operations further comprise:
   based on a finding of a plurality of driving information within a distance from the vehicle, outputting the plurality of driving information on the display; and
   based on a selection of one driving information among the plurality of driving information, autonomously driving the vehicle according to the selected one driving information and removing output of unselected driving information among the plurality of driving information from the display.

8. The device of claim 2, wherein the operations further comprise updating the driving information of the vehicle to include second driving information descriptive of how the vehicle entered the start region in the manual driving mode.

9. The device of claim 8, wherein updating the driving information of the vehicle to include the second driving information includes updating the start region of the driving information of the vehicle to include a starting point of the second driving information, and
wherein the travel route of the driving information of the vehicle further includes a first travel route from the starting point of the second driving information to the start region.

10. The device of claim 1, wherein the computer-readable medium is configured to store the driving information of the vehicle that has traveled in the manual driving mode.

11. The device of claim 1, wherein the operations further comprise:
determining that the vehicle has entered a start region of the new driving information in the manual driving mode; and
updating the new driving information to include second driving information descriptive of how the vehicle enters the start region of the new driving information from a current position of the vehicle in the manual driving mode.

12. The device of claim 1, further comprising a sensor configured to sense information related to the vehicle, and wherein the operations further comprise:
determining, based on the information from the sensor, whether an object that is not included in the driving information of the vehicle exists on the travel route while autonomously driving the vehicle, and
based on the determination that the object that is not included in the driving information of the vehicle exists, autonomously driving the vehicle outside the travel route to avoid the object.

13. The device of claim 1, wherein the communicator is configured to receive information that is related to the vehicle and that is sensed by another vehicle, and
wherein the operations further comprise autonomously driving the vehicle along the travel route based on the information that is received through the communicator.

14. The device of claim 1, wherein the operations further comprise:
based on the determination that the vehicle is outside of the start region and needs to enter the start region in the manual driving mode, providing at least one route from a current position of the vehicle to the start region.

15. A vehicle comprising the vehicle control device according to claim 1.

16. A method for controlling a vehicle, the method comprising:
determining to autonomously drive to a destination;
based on the determination to autonomously drive to the destination, identifying driving information of the vehicle that has traveled to the destination in a manual driving mode,
wherein the driving information of the vehicle includes:
a start region from which the vehicle started traveling to the destination in the manual driving mode,
an end region at which the vehicle finished traveling to the destination in the manual driving mode, and
a travel route from the start region to the end region, and
wherein the method further comprises:
determining that the vehicle is outside of the start region and needs to enter the start region in the manual driving mode to begin autonomously driving to the destination,
determining that the vehicle has entered the start region in the manual driving mode,
based on the determination that the vehicle has entered the start region in the manual driving mode, switching to an autonomous driving mode and autonomously driving the vehicle along the travel route from the start region to the end region,
outputting, on a display provided at the vehicle, screen information for selecting a first end region,
based on a selection of the first end region, receiving first driving information including the first end region from at least one of a mobile terminal or an external device through a communicator of the vehicle, the first driving information comprising information learned by manual travel of another vehicle, wherein receiving the first driving information comprises receiving a plurality of first driving information including the first end region from at least one of the mobile terminal or the external device through the communicator, and
generating new driving information to drive the vehicle to the selected first end region based on the plurality of first driving information received from at least one of the mobile terminal or the external device through the communicator.

17. The method of claim 16, further comprising:
outputting at least one end point within the end region on the display;
receiving a selection of an end point from the at least one end point within the end region;
based on the selection of the end point, outputting a start point associated with the end point on the display,
determining that the vehicle has entered the start region including the start point in the manual driving mode, and
based on the determination that the vehicle has entered the start region including the start point in the manual driving mode, switching to the autonomous driving mode and autonomously driving the vehicle along the travel route from the start region to the end region.

18. The method of claim 17, wherein outputting the at least one end point on the display comprises outputting the at least one end point on the display based on at least one of an entrance of the vehicle into a place corresponding to the driving information of the vehicle, a reception of the first driving information through the communicator, or a reception of a user request.

* * * * *